US008020631B2

(12) United States Patent
Kobayashi

(10) Patent No.: US 8,020,631 B2
(45) **Date of Patent: *Sep. 20, 2011**

(54) REVERSIBLE VALVE ASSEMBLY FOR A PNEUMATIC TOOL

(75) Inventor: Shigeki Kobayashi, Nagano (JP)

(73) Assignee: SP Air Kabushiki Kaisha, Kamiminochi-Gun, Nagano (JP)

( * ) Notice: Subject to any disclaimer, the term of this patent is extended or adjusted under 35 U.S.C. 154(b) by 97 days.

This patent is subject to a terminal disclaimer.

(21) Appl. No.: 11/837,044

(22) Filed: Aug. 10, 2007

(65) Prior Publication Data

US 2008/0066941 A1 Mar. 20, 2008

Related U.S. Application Data

(63) Continuation-in-part of application No. 11/559,170, filed on Nov. 13, 2006.

(60) Provisional application No. 60/825,995, filed on Sep. 18, 2006.

(51) Int. Cl.
*B23B 45/04* (2006.01)

(52) U.S. Cl. .................... 173/218; 173/169; 137/625.43

(58) Field of Classification Search .................. 173/213, 173/218, 221, 168, 169; 251/304
See application file for complete search history.

(56) References Cited

U.S. PATENT DOCUMENTS 2,673,061 A 3/1954 Broz
2,903,111 A 9/1959 Young
3,129,796 A 4/1964 Karden
3,179,219 A 4/1965 Karden
3,298,284 A * 1/1967 Alexander .................... 418/270
3,318,390 A 5/1967 Hoza et al.
3,951,217 A 4/1976 Wallace et al.
4,236,589 A * 12/1980 Griffith ......................... 173/169
4,890,713 A 1/1990 Pagano
4,920,836 A * 5/1990 Sugimoto et al. ............... 81/463
5,083,619 A * 1/1992 Giardino et al. ................ 173/93
5,199,460 A 4/1993 Geiger
5,213,136 A * 5/1993 Thorp et al. ............. 137/625.68
5,269,768 A 12/1993 Cheung
5,303,781 A * 4/1994 Lin .............................. 173/169
5,377,769 A * 1/1995 Hasuo et al. .................. 173/169
5,797,462 A 8/1998 Rahm
5,918,686 A 7/1999 Izumisawa
6,431,846 B1 * 8/2002 Zinck ........................... 418/270
6,443,239 B1 9/2002 Izumisawa (Continued)

OTHER PUBLICATIONS

USPTO Office action issued in U.S. Appl. No. 11/559,170 dated Jul. 24, 2008, 11 pages.

(Continued)

*Primary Examiner* — Lindsay Low
(74) *Attorney, Agent, or Firm* — Senniger Powers LLP

(57) ABSTRACT

A pneumatic rotary tool comprises a housing, a square drive output member supported by the housing for rotational movement, and a pneumatic motor disposed in the housing for driving rotation of the square drive. A valve is disposed in the housing for rotary movement between a first position in which pressurized air powers the motor in a forward direction and a second position in which pressurized air powers the motor in a reverse direction. An actuator supported on the housing for translational movement is connected to the valve by a lost motion connection system. The lost motion connection system comprises first and second connector elements that are engaged for generally conjoint movement in a first direction and for relative sliding movement in a second direction generally perpendicular to the first direction.

12 Claims, 27 Drawing Sheets

U.S. PATENT DOCUMENTS

| | | | | |
|---|---|---|---|---|
| 6,634,438 | B1 * | 10/2003 | Pusateri et al. | 173/1 |
| 6,796,386 | B2 | 9/2004 | Izumisawa et al. | |
| 6,883,619 | B1 | 4/2005 | Huang | |
| 6,938,706 | B2 | 9/2005 | Ng | |
| 7,487,844 | B2 | 2/2009 | DeCicco et al. | |
| 2003/0010514 | A1 | 1/2003 | Taga | |
| 2003/0075348 | A1 | 4/2003 | Eardley et al. | |
| 2003/0121680 | A1 | 7/2003 | Izumisawa et al. | |
| 2004/0144553 | A1 | 7/2004 | Ashbaugh | |
| 2006/0102367 | A1 * | 5/2006 | Etter et al. | 173/218 |

OTHER PUBLICATIONS

Office action dated Jan. 26, 2009 regarding U.S. Appl. No. 11/559,170, 7 pages.

* cited by examiner

REVERSIBLE VALVE ASSEMBLY FOR A PNEUMATIC TOOL

CROSS-REFERENCE TO RELATED APPLICATIONS

This application is a continuation-in-part of U.S. patent application Ser. No. 11/559,170, filed Nov. 13, 2006 and entitled Reversible Valve Assembly for a Pneumatic Tool, which claims the benefit of U.S. Provisional Application No. 60/825,995, filed Sep. 18, 2006, and entitled Reversible Valve Assembly for a Pneumatic Tool, the entirety of the disclosure of each application being hereby incorporated by reference.

BACKGROUND OF THE INVENTION

This invention relates generally to pneumatic rotary tools and more specifically to a pneumatic rotary tool having a reversible valve assembly for controlling the direction of airflow through the tool and the direction of rotational output of the tool.

Pneumatic rotary tools are commonly used in applications where it is desirable to turn a fastener element, such as a bolt or nut, in a forward or a reverse direction for tightening or loosening it. Pneumatic rotary tools are advantageous because they can rapidly rotate the fastener element for tightening or loosening the fastener element. Some pneumatic tools are capable of imparting large amounts of torque to the fastener. This is particularly desirable in automotive repair and industrial applications where fasteners may be difficult to loosen or may require large amounts of torque to tighten.

Pneumatic rotary tools typically include an output member (e.g., a socket) sized to engage the fastener. Pressurized air flows through the tool and drives an air motor which in turn drives the socket. Air typically flows to the motor through one of two passages. When air flows through a first passage, it drives the motor in a forward (generally tightening) direction. When air flows through a second passage, it drives the motor in a reverse (generally loosening) direction.

A valve is used to direct the air flow to the first or second passage. Typically, the valve includes a directional channel to direct the air to the desired passage and an arm connected to the valve for moving the directional channel to the desired position. In many tools, the arm extends laterally outward from the tool at a location, for example, above the trigger. Alternatively, a pair of arms may be used to move the valve. In U.S. Pat. No. 5,199,460 (Geiger), for example, air flows through a tubular spool to either a forward supply port or a reverse supply port. A rack and pinion system rotates the spool and aligns it with the desired port. Two arms (racks) are located on opposite sides of the spool (pinion) so that the desired arm may be pressed into the housing to rotate the spool to the desired position. When one arm is pressed into the housing, the opposite arm moves out of the housing in a rearward direction. The outward arm can subsequently be pressed into the housing to change the position of the spool.

A drawback to valves currently used is that the structure used to move the valves (e.g., the arm(s)) often protrudes outward from the tool, leaving it susceptible to inadvertent contact or movement during operation. It would therefore be desirable to provide a pneumatic tool with a simple valve construction that securely remains in the desired operating position under normal operation conditions.

SUMMARY OF THE INVENTION

In one aspect of the present invention, a pneumatic tool generally comprises a housing and an output member supported by the housing for rotational movement relative to the housing. An air motor is disposed in the housing and is operatively connected to the output member for driving the output member in either a reverse direction or a forward direction. Air passaging in the housing delivers pressurized air to the air motor. The air passaging has an inlet. A plunger is slidable for actuating selective opening and closing of the inlet of the air passaging to selectively allow introduction of pressurized air into the air passaging. A valve comprises a valve component disposed within the air passaging. The valve component is selectively rotatable generally about the plunger on a rotational axis between a forward-driving position, in which the valve component directs pressurized air entering the passaging through inlet to the air motor to drive the motor in the forward direction, and a reverse-driving position, in which the valve component directs pressurized air entering the passaging through the inlet to the air motor to drive the motor in the reverse direction. An actuator is supported by the housing for translational movement along a generally linear actuating axis. A connection system interconnects the actuator and the valve. The connection system is adapted to convert the translational movement of the actuator along the linear actuating axis into angular movement of the valve component about the rotational axis to selectively rotate the valve component between the forward-driving position and the reverse-driving position.

In another aspect, a pneumatic tool generally comprises a housing and an output member supported by the housing for rotational movement relative to the housing. An air motor is disposed in the housing and is operatively connected to the output member for driving the output member in either a reverse direction or a forward direction. A main inlet in the housing receives pressurized air from a source of pressurized air to power the motor. The inlet is configured to be selectively closed and opened. In-flow passaging in the housing defines an in-flow path for directing pressurized air from the inlet to the motor. The in-flow passaging includes a forward-driving air passage for delivering pressurized air from the air inlet to the motor to drive the output member in the forward direction, and a second air passage for delivering pressurized air from the air inlet to the motor to drive the output member in the reverse direction. A trigger includes a plunger that is moveable linearly along its longitudinal axis for actuating selective opening and closing of the main inlet to respectively allow introduction of pressurized air into the in-flow passaging. A valve comprises a valve component disposed between the inlet and the forward-driving and reverse-driving passages. The valve component is mounted for rotation generally about the plunger on a rotational axis between a forward-driving position, in which the valve component directs air flow to the forward-driving air passage to drive the motor in the forward direction, and a reverse-driving position, in which the valve component directs air flow to the reverse-driving air passage to drive the motor in the reverse direction. An actuator is supported by the housing for translational movement along a linear actuating axis. A lost motion connection system interconnects the actuator and the valve. The connection system is adapted to translate linear movement of the actuator along the linear actuating axis into rotational movement of the valve component.

Other features of the invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE DRAWINGS

Figure 1:
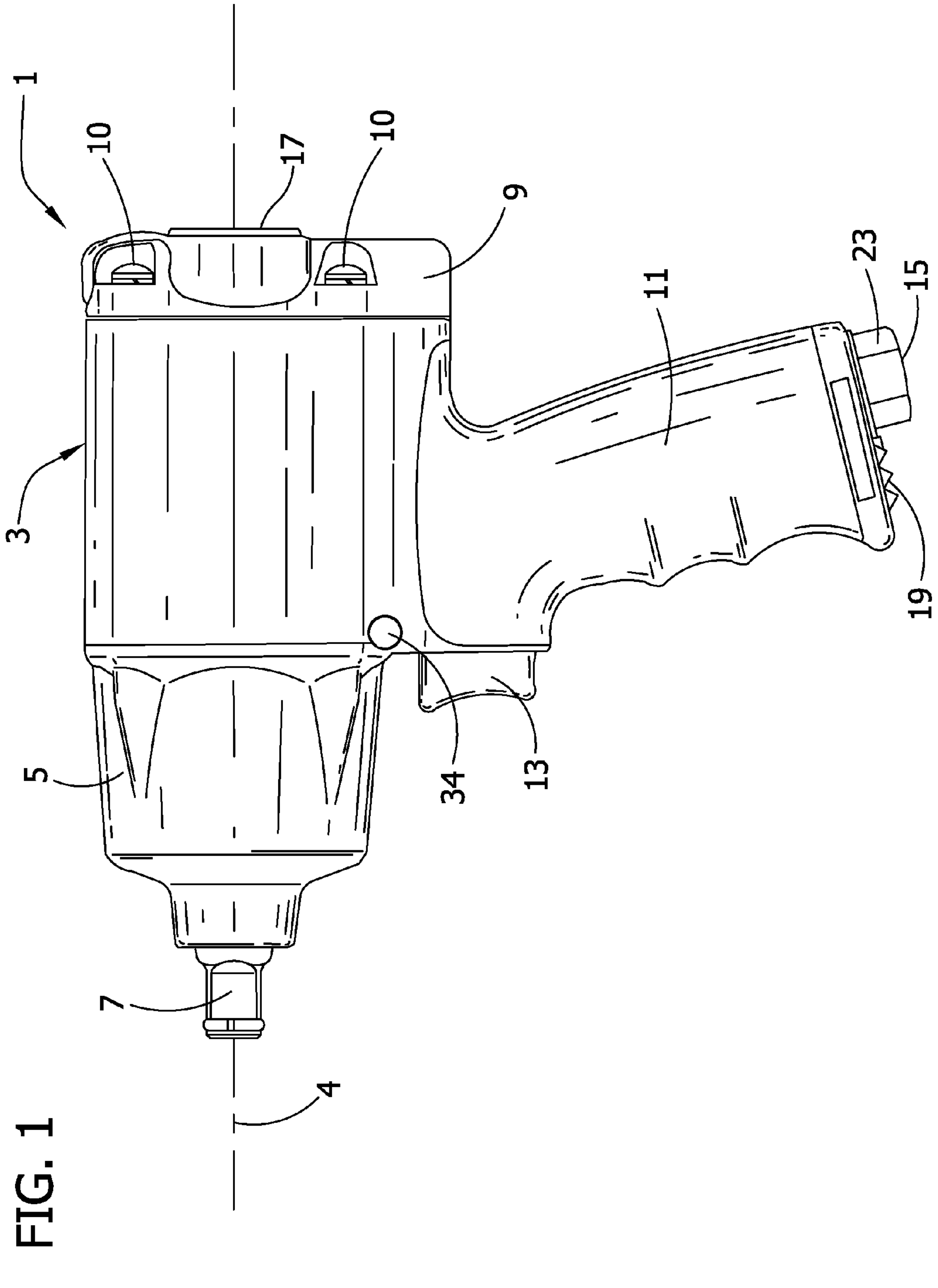
FIG. 1 is a side elevation of a pneumatic rotary tool according to a first embodiment of the invention.

Referring now to the drawings and particularly to FIG. 1, a first embodiment of a pneumatic rotary tool of the present invention is indicated generally at 1. In the drawings, the tool 1 is illustrated as an impact wrench and generally comprises a housing (indicated generally at 3) having an axis 4, a clutch casing 5 at the front of the housing 3, an output member 7 extending forward out of the clutch casing 5, and an end cover 9 mounted on the rear of the housing 3. The output member 7 is supported by the housing 3 for rotational movement relative to the housing about the axis 4. The output member 7 is illustrated as a square drive, but may be shaped differently within the scope of the invention. Four threaded fasteners 10, for example bolts, extend through the end cover 9 and housing 3 and thread into the clutch casing 5, securing the tool components together. The tool components may be secured together differently, for example with different fasteners, within the scope of the invention. The tool 1 further comprises a grip 11 extending downwardly from the housing 3, allowing a user to grasp and hold the tool 1 securely. The clutch casing 5, end cover 9 and grip 11 may all be considered part of the housing 3 for purposes of the present invention. A trigger 13 extends from the front of the grip 11 for activating the tool 1, and an air inlet 15 is defined in the lower portion of the grip 11 for receiving pressurized air from a source of pressurized air (not shown) for supplying the pressurized air to the tool 1 as is conventional in the industry.

Figure 2:
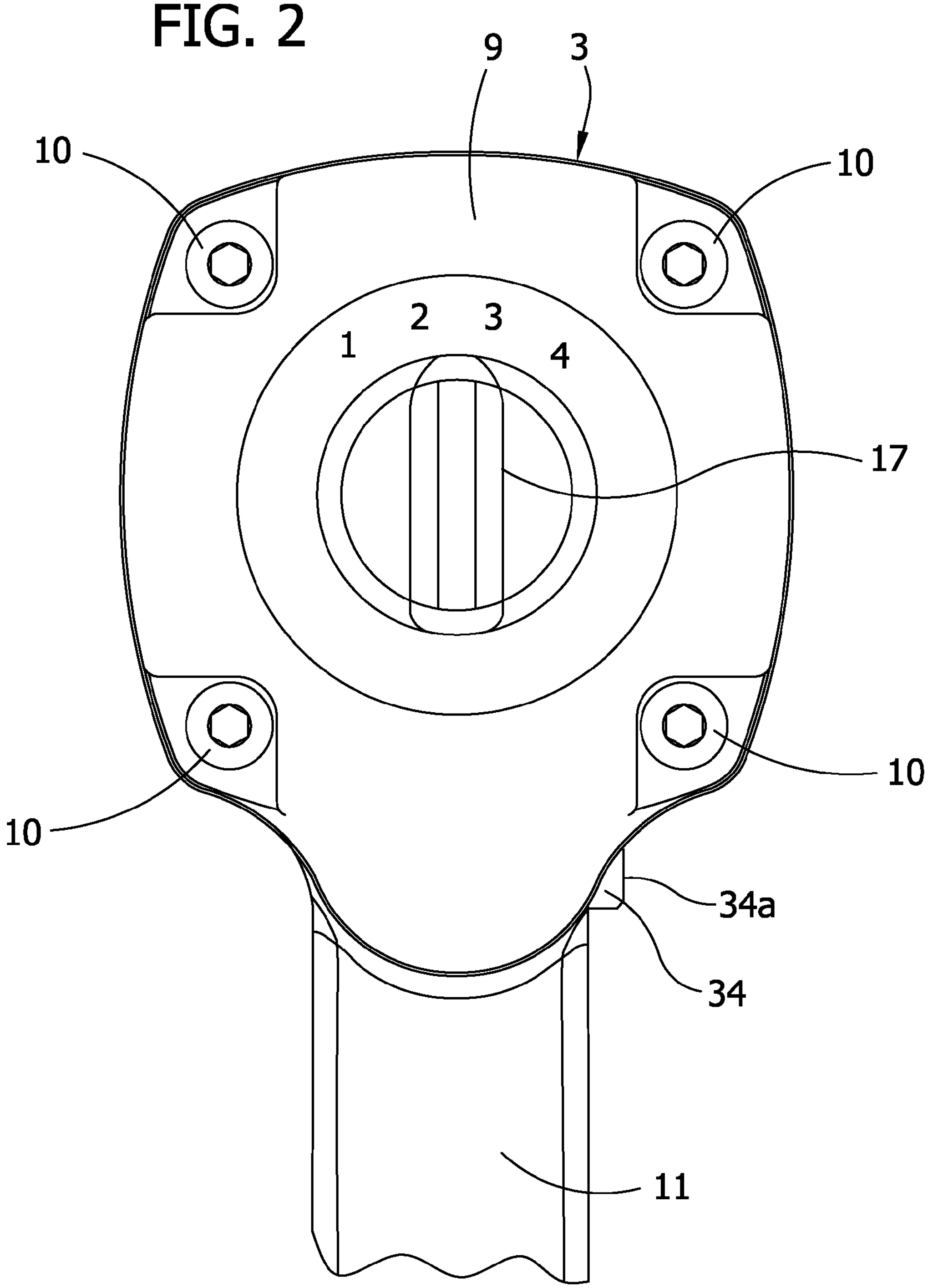
FIG. 2 is an enlarged, fragmentary rear elevation of the tool.
Figure 11:
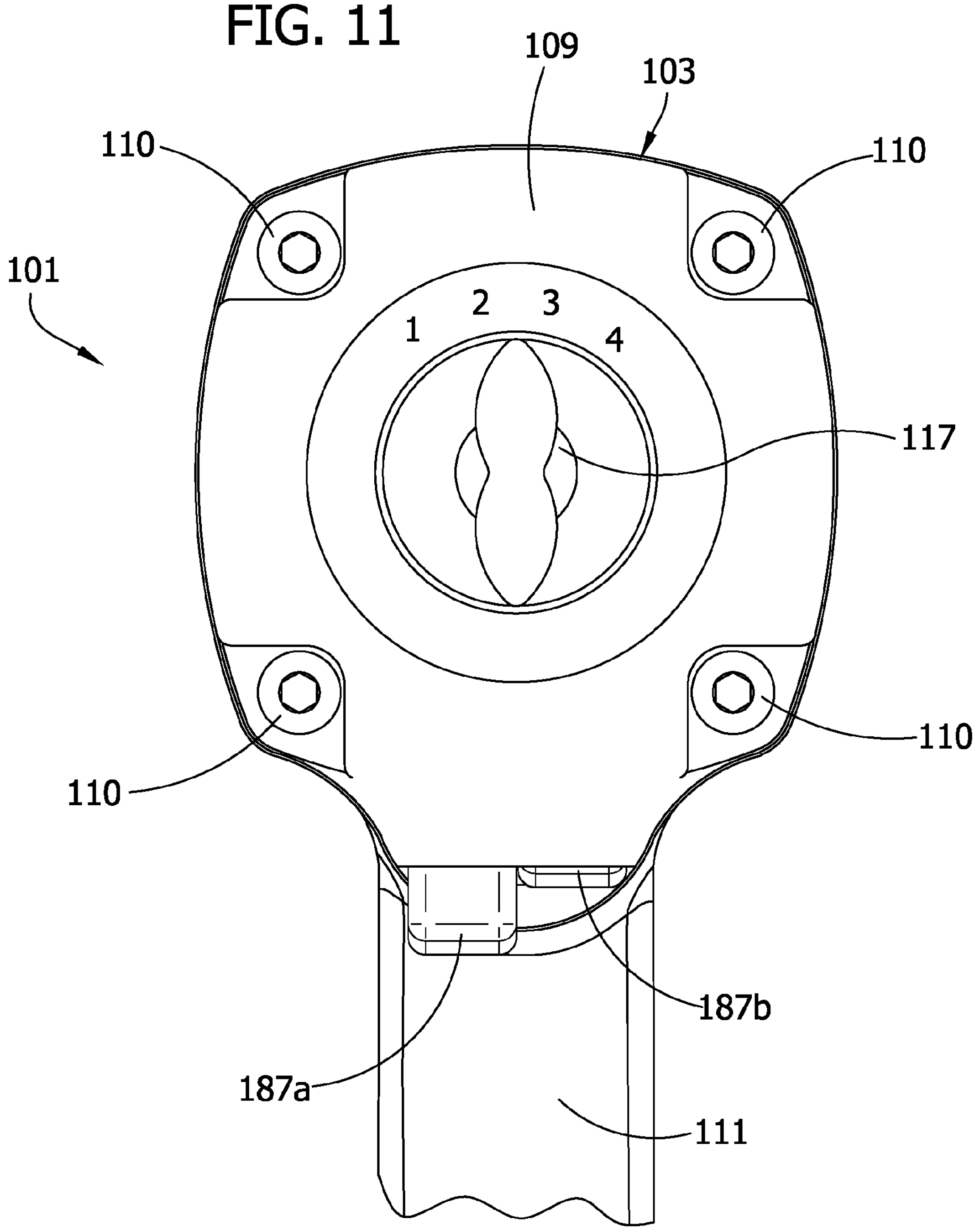
FIG. 11 is a fragmentary rear elevation of a pneumatic tool according to a second embodiment of the invention.

Referring now to FIG. 2, the tool 1 comprises a torque selector 17 mounted on the end cover 9 and rotatable within the end cover for controlling the torque of the tool 1 by throttling the flow of compressed air. In the illustrated embodiment, the torque selector 17 rotates within the end cover 9 between four discrete positions corresponding to four torque settings. The functioning of the torque selector 17 is not described further herein, but is described in detail in related, co-owned U.S. Pat. No. 6,796,386 (Izumisawa et al.). A torque selector is not necessary to practice the invention, and differently constructed torque selectors may be used within the scope of the invention (see, e.g., FIG. 11 illustrating a second embodiment of the invention in which an exterior part of a torque selector 117 is differently shaped).

Figure 3:
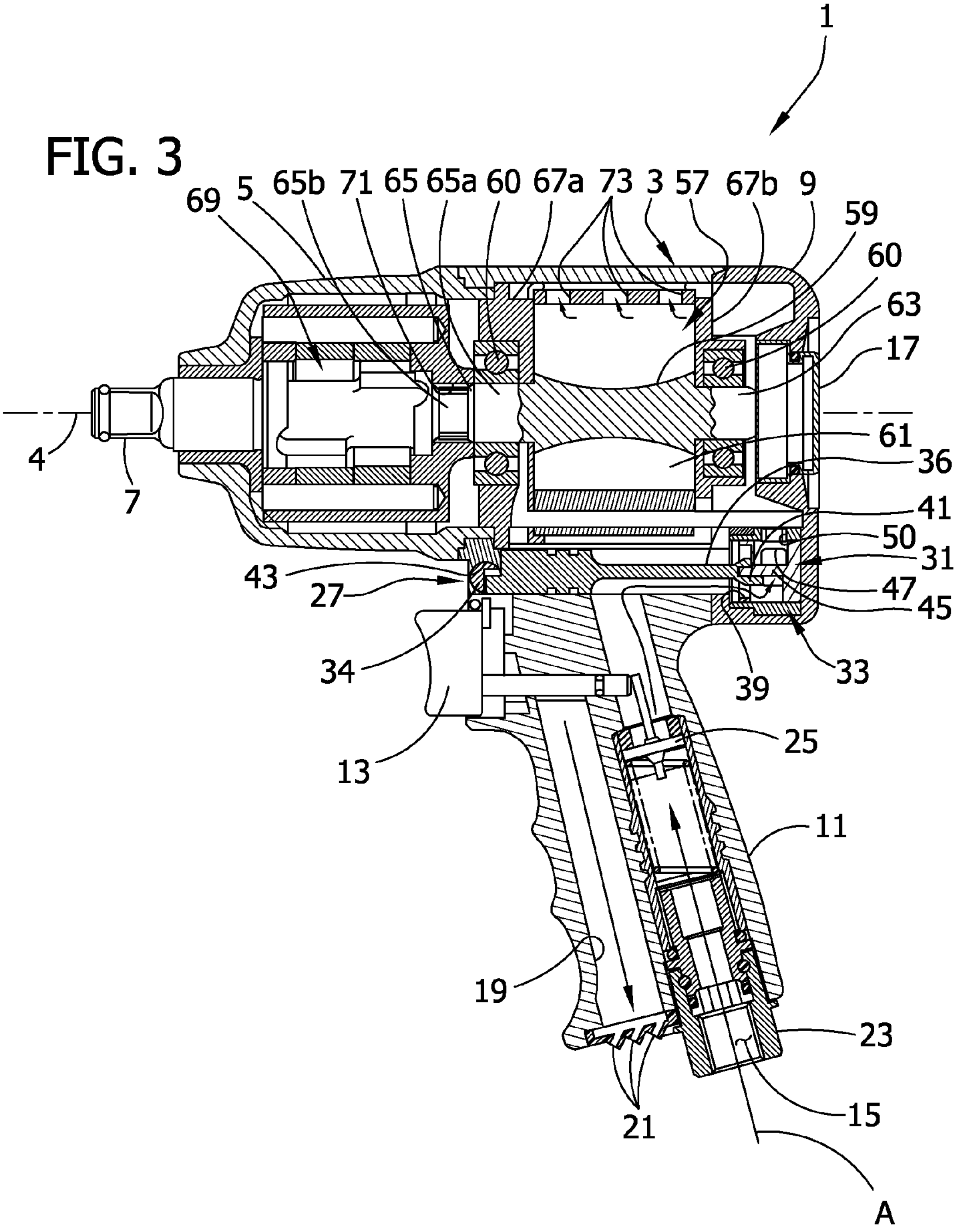
FIG. 3 is a vertical section of the tool.
Figure 4:
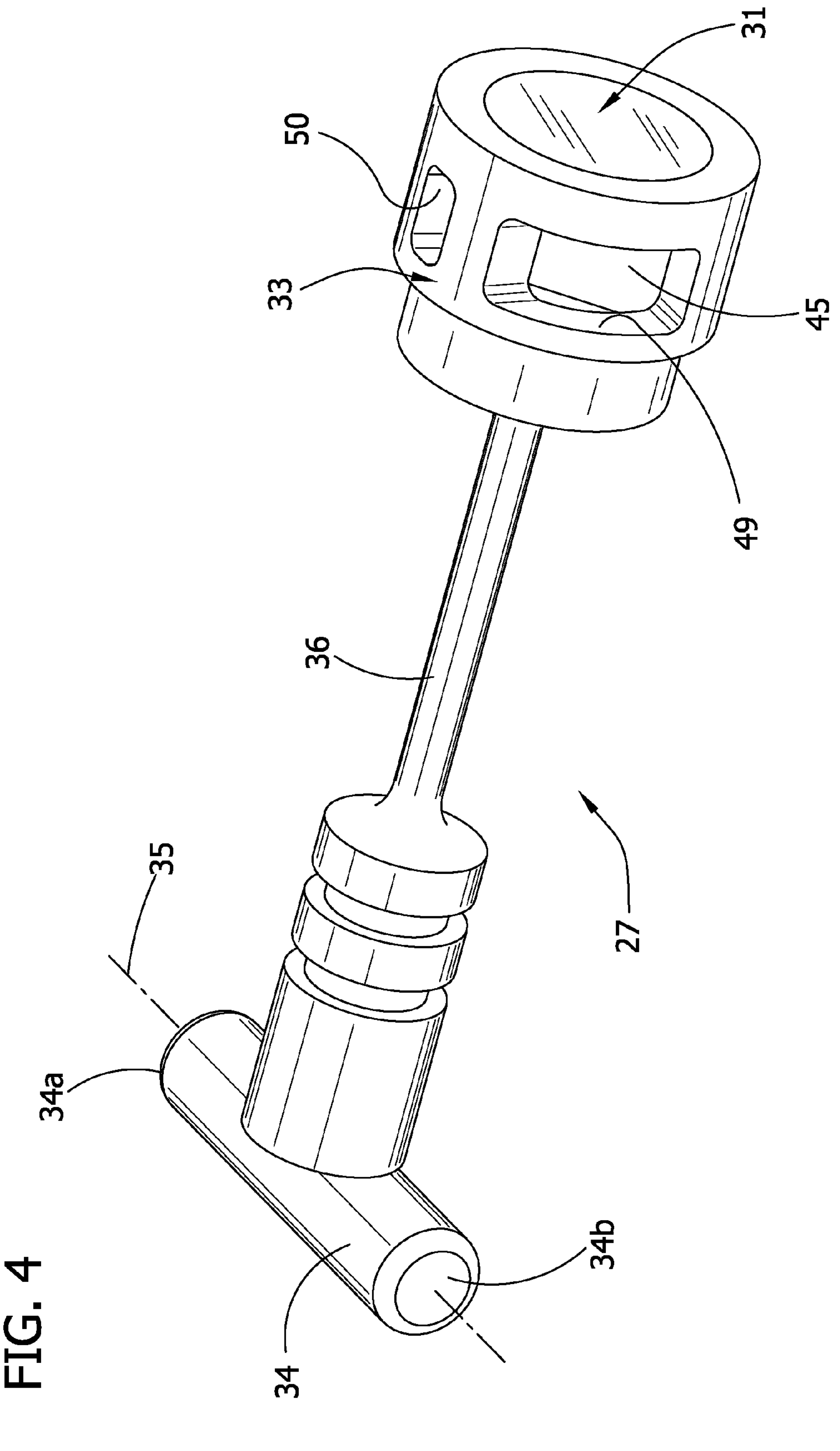
FIG. 4 is a perspective of a valve assembly of the tool.
Figure 5:
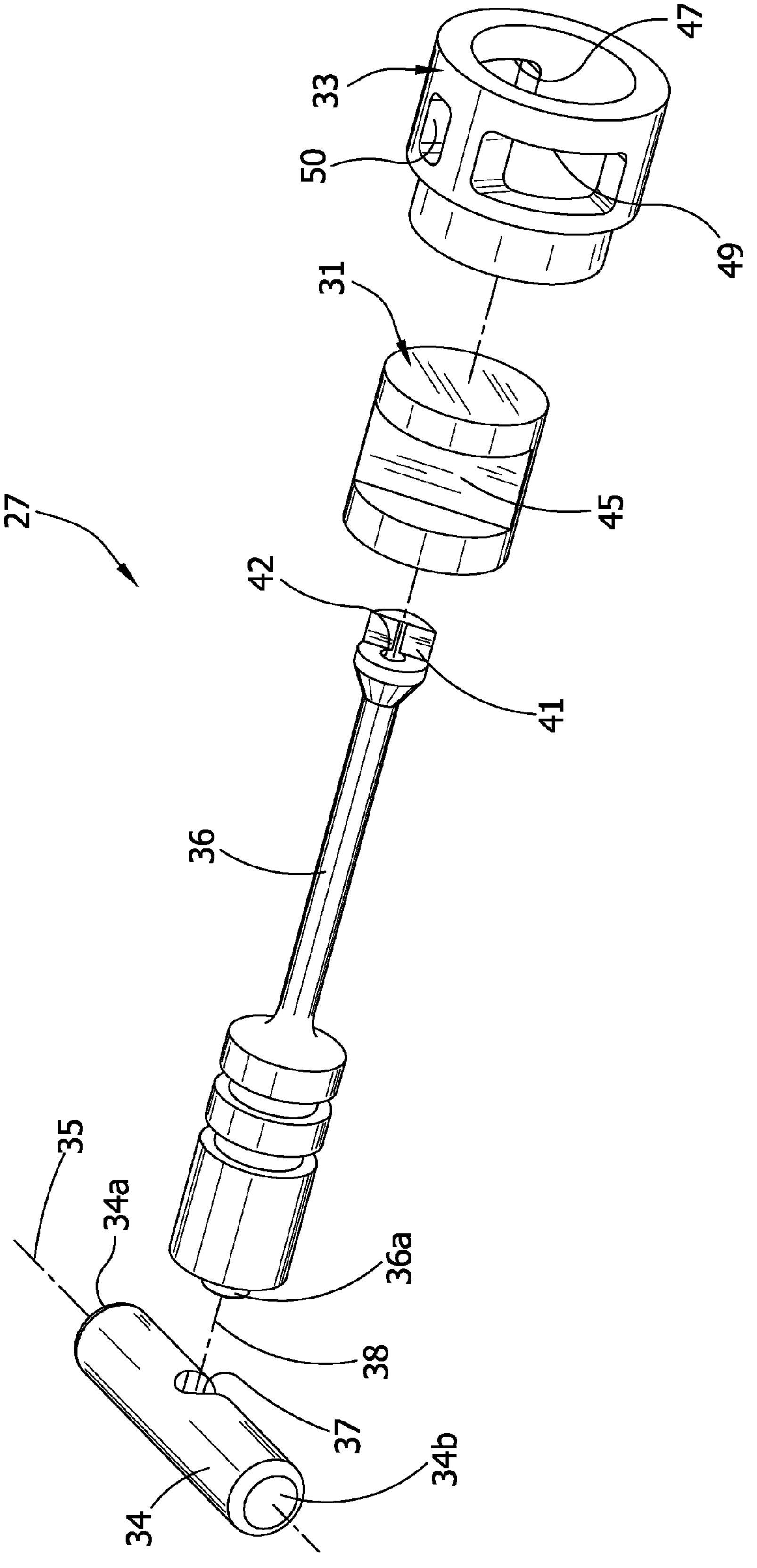
FIG. 5 is the perspective of FIG. 4 exploded.
Figure 6:
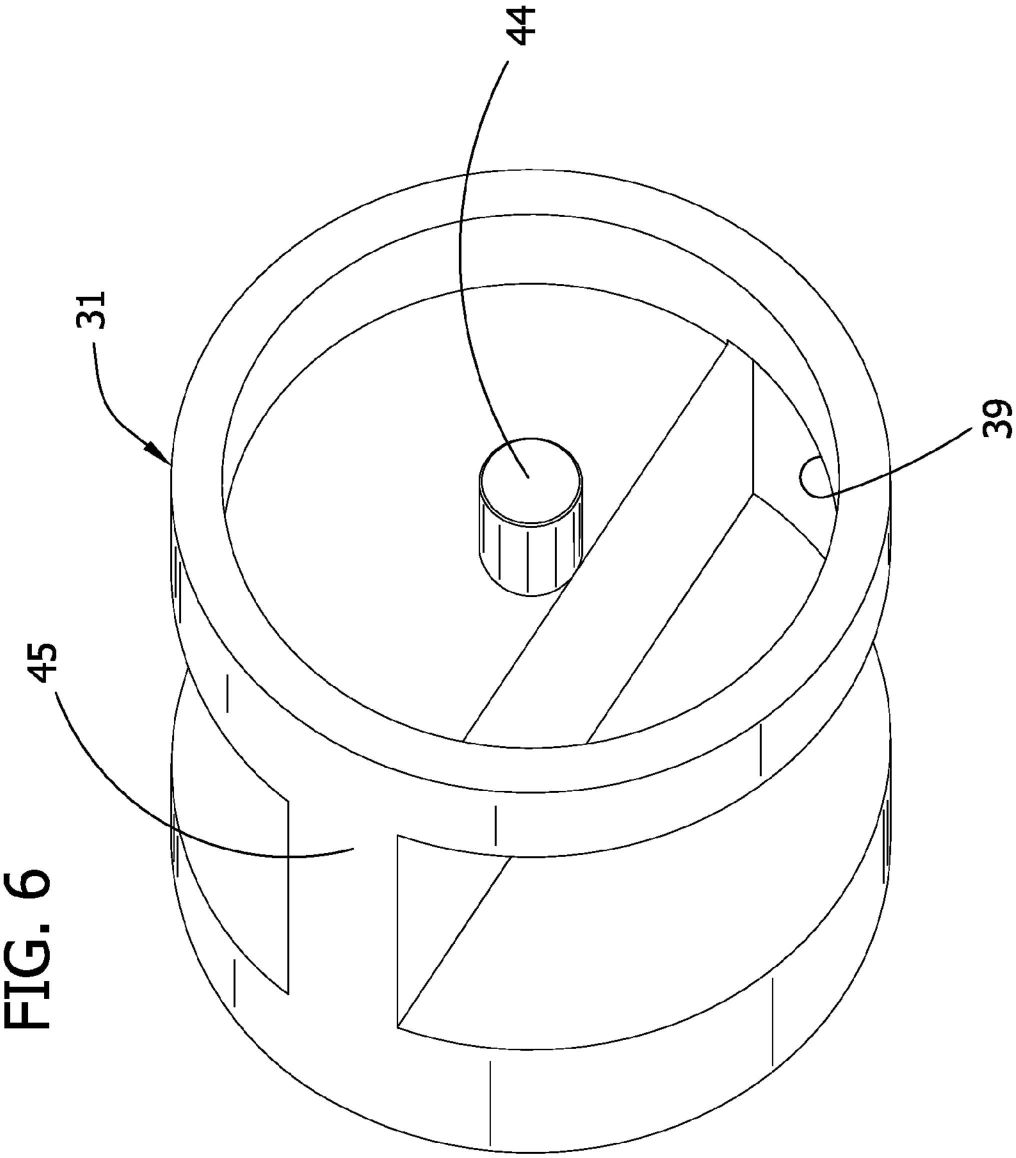
FIG. 6 is a perspective of a first valve member of the valve assembly.
Figure 7:
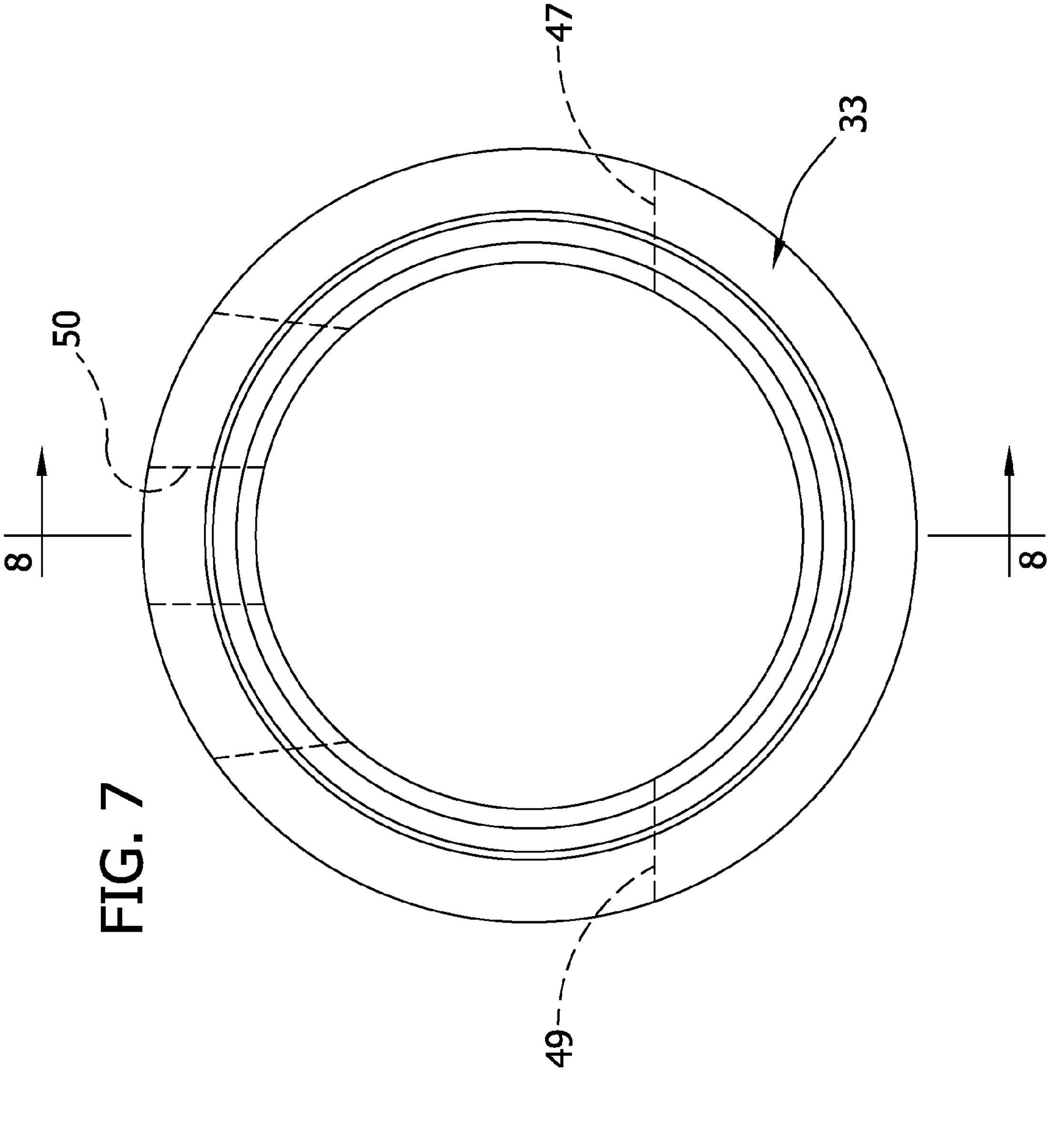
FIG. 7 is a front elevation of a second valve member of the valve assembly.
Figure 8:
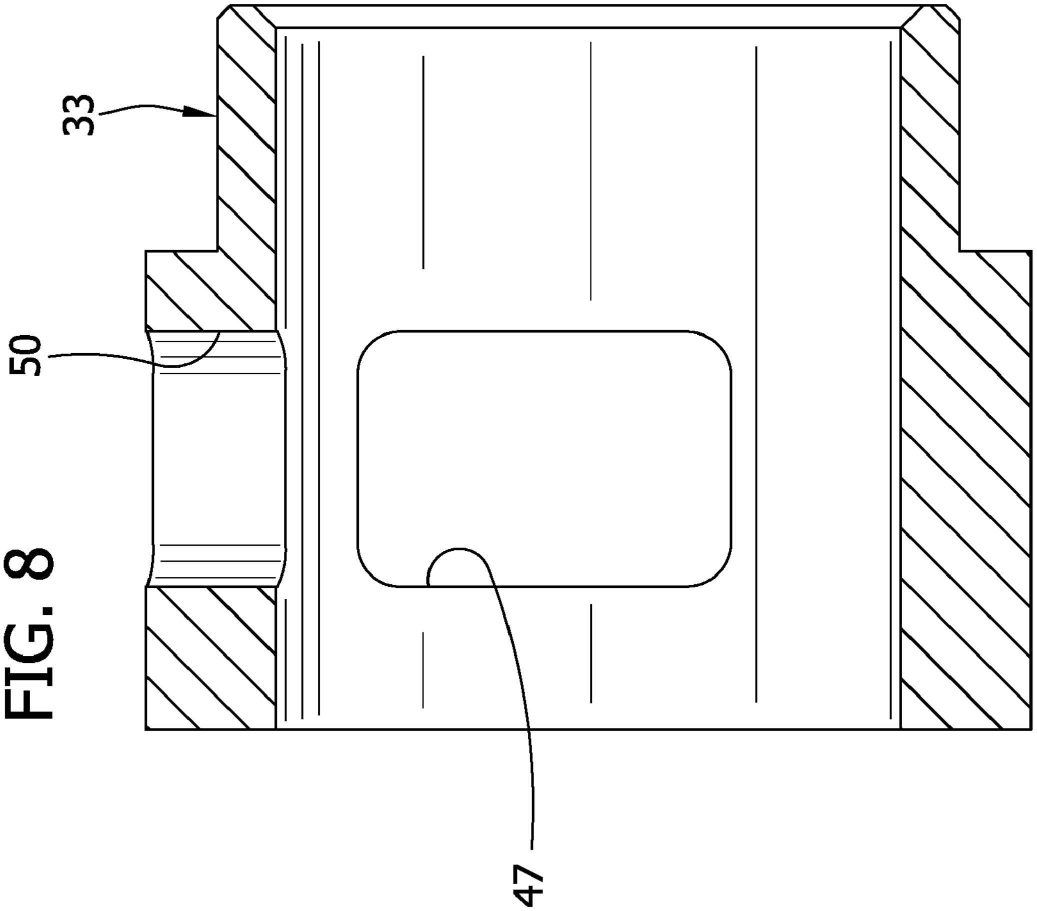
FIG. 8 is a cross-section of the second valve member taken on line 8-8 of FIG. 7.

Referring to FIG. 3, an air exhaust 19 is defined in the lower portion of the grip 11, adjacent the air inlet 15. The air exhaust 19 includes a diffuser 21 for directing exhaust air as it exits the tool away from the user and preventing foreign objects from entering the air exhaust 19.

Figure 9A:
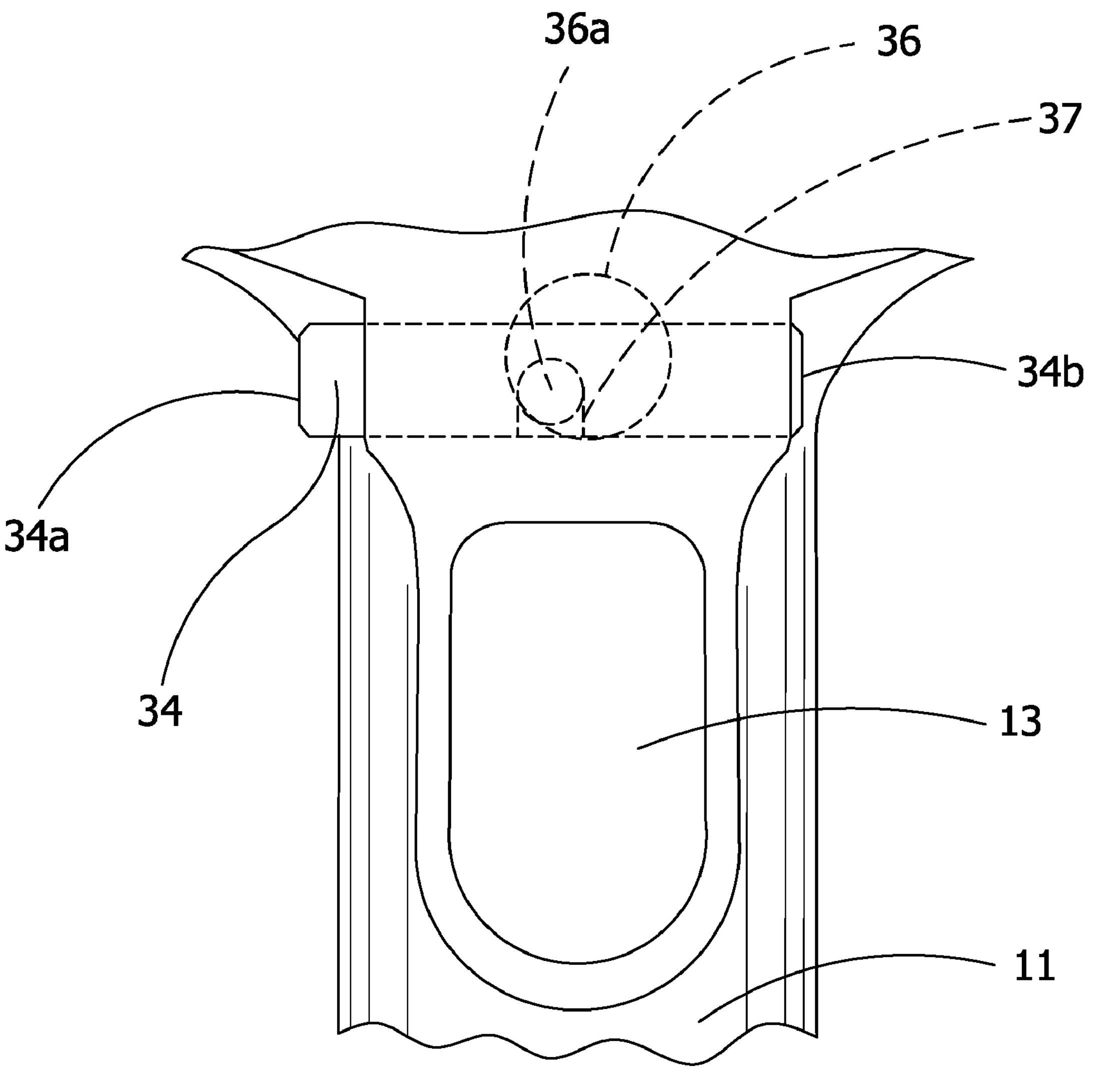
FIG. 9A is a fragmentary front elevation of the tool with part of a pin and a tab of the valve assembly shown by hidden lines, and with the valve assembly in a reverse operating position.
Figure 9B:
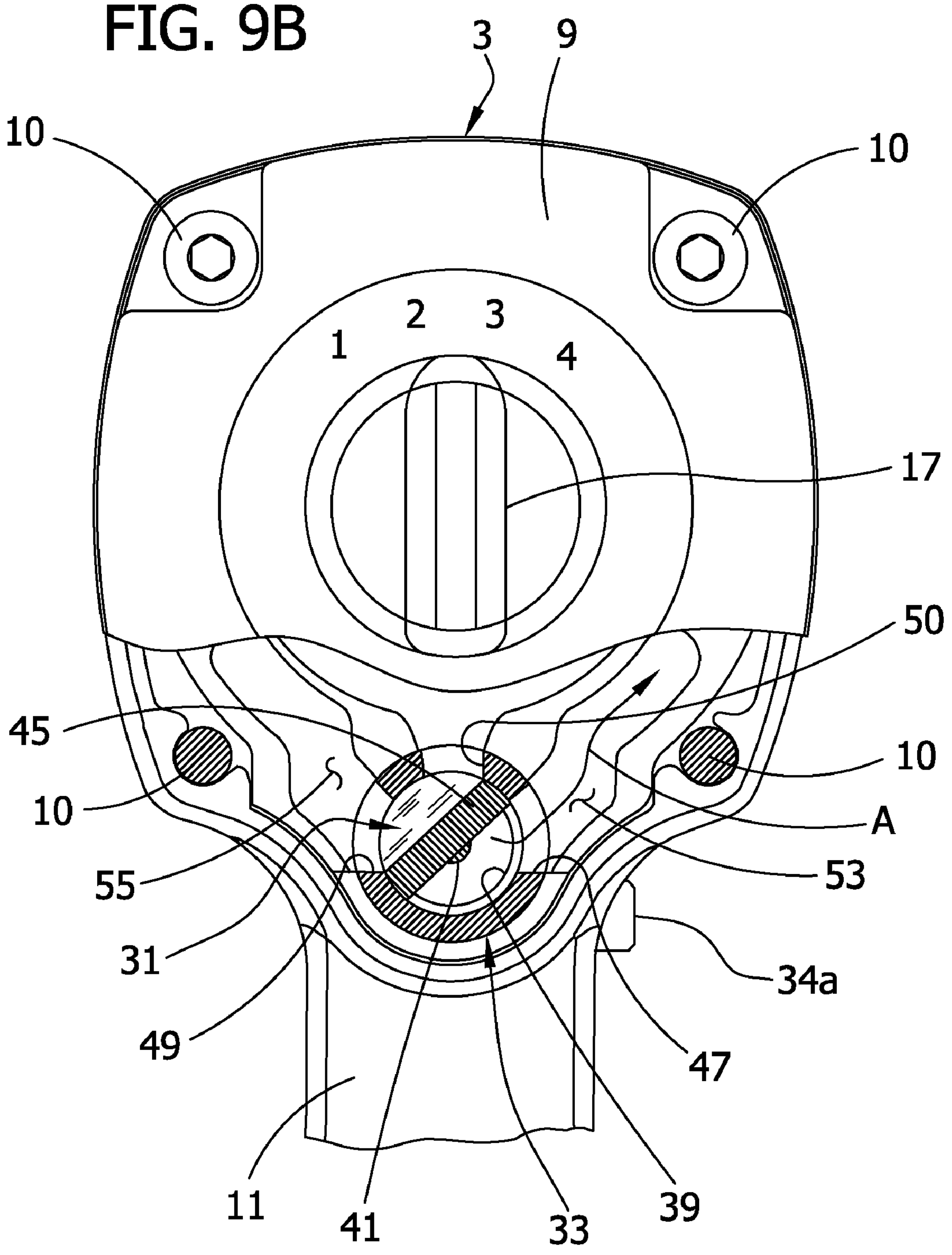
FIG. 9B is a fragmentary rear elevation of the tool with parts of an end cap and the valve assembly broken away, and with the valve assembly in the reverse operating position.
Figure 10A:
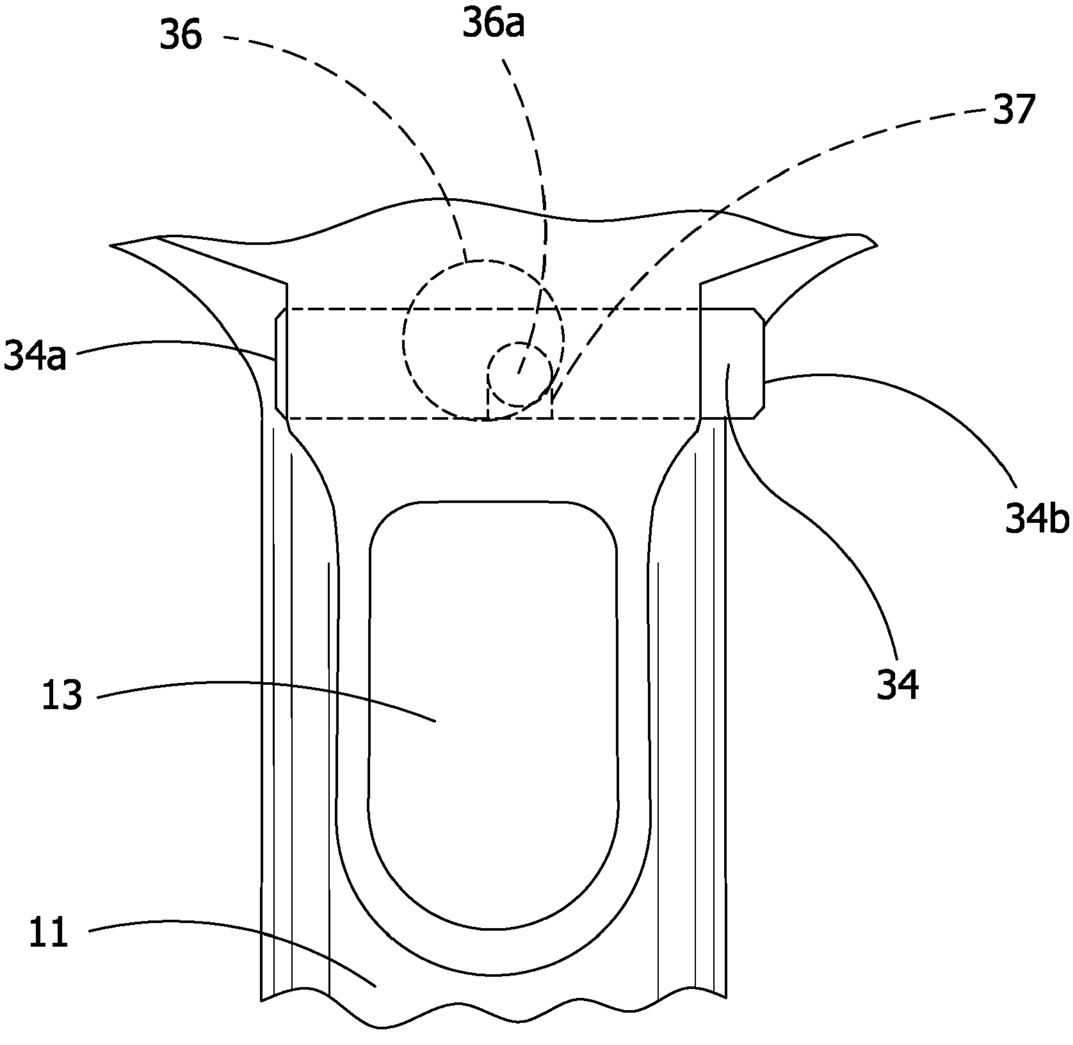
FIG. 10A is the elevation of FIG. 9A with the valve assembly in a forward operating position.
Figure 10B:
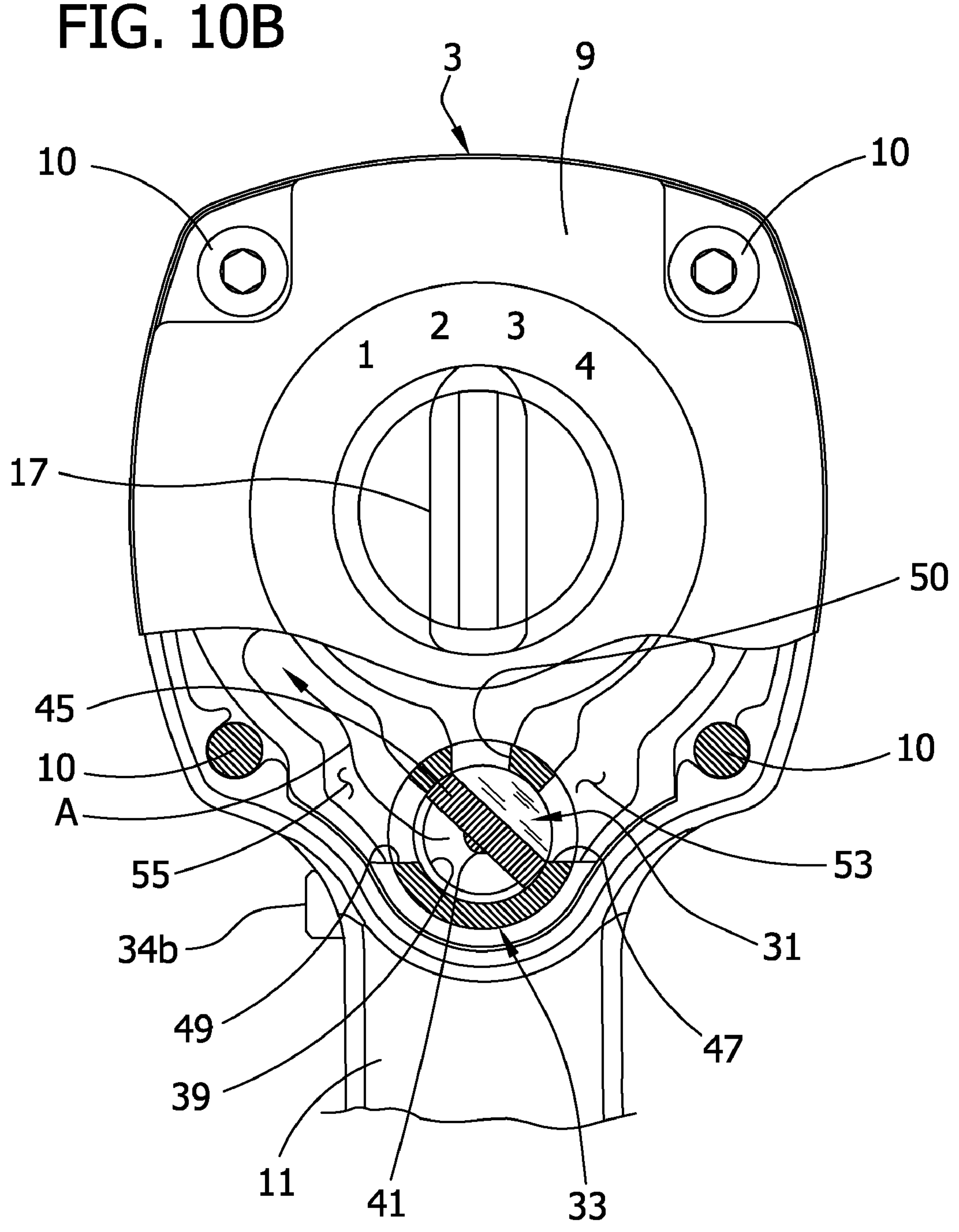
FIG. 10B is the elevation of FIG. 9B with the valve assembly in the forward operating position.

Air flow through passaging in the housing 3 of the tool 1 is indicated generally by line A in FIGS. 3, 9B, and 10B. Following the path of line A, pressurized air is first received into the tool 1 through the air inlet 15, which is more particularly defined by a fitting 23 for connecting the tool 1 to an air hose and source of pressurized air (not shown) as is known in the art. After the inlet 15, the air passes through a spring-biased tilt valve 25 that can be opened by pulling the trigger 13. The detailed construction and operation of the tilt valve 25 will not be discussed here, as the design is well known in the relevant art. The air then passes to a selector valve assembly, indicated generally at 27, located in the housing 3 just above the trigger 13.

As shown in greater detail in FIGS. 4-8, the selector valve assembly 27 comprises an elongate actuating pin 34 with first and second ends 34*a*, 34*b* (respectively) and longitudinal axis 35 operatively connected to a first valve member (indicated generally at 31) by a shaft 36 for rotatably moving the valve member within a second valve member (indicated generally at 33) fixed in position within the rear end of the tool 1 (FIG. 3). The first valve member 31, second valve member 33 and shaft 36 can be broadly referred to as a "valve", and the actuating pin 34 can be broadly referred to as an "actuator". The shaft 36 connects to the pin 34 at tab 36*a* in a slot 37 (the tab and slot can broadly be referred to as "connector elements") in the pin so that a longitudinal axis 38 (FIG. 5) of the shaft 36 is generally perpendicular to the longitudinal axis 35 of the pin 34. As better seen with reference to FIGS. 9A and 10A, the tab 36*a* is located off-center and thus away from the axis 38 of the shaft 36. The slot 37 is located generally below the longitudinal axis 35 of the pin 34 so that movement of the pin in a direction along its longitudinal axis 35 produces rotational movement of the shaft 36 about axis 38. The tab 36A moves conjointly with the slot 37 and pin 34 with respect to the lateral component of the tab's rotary movement about the axis 38. The vertical extent of the slot 37 allows the tab 36A to slide relative to the pin 34 in the slot so that the slot and tab do not move conjointly with respect to the vertical component of the tab's rotary motion. Thus, the tab 36A and slot 37 form a lost motion connection in the first embodiment. The shaft 36 connects to the first valve member 31 at an air opening 39 (FIG. 6) in the valve member. A semi-cylindrical finger 41 of the shaft 36 fits in the air opening 39 so that a flat surface of the finger lies against a bottom surface of a planar deflector 45 of the first valve member 31 (also see FIGS. 9B and 10B). The finger 41 is smaller than the air opening 39 so that air can still flow through the opening. An opening 42 in the finger 41 receives cylindrical extension 44 (FIG. 6) of the first valve member 31 for securing the finger to the valve member. Through this connection, the rotational movement of the shaft 36 conjointly rotates the first valve member 31. The first valve member and shaft 36 may be formed as one piece within the scope of the present invention.

As shown in FIG. 3, the actuating pin 34 is positioned generally above the trigger 13 for easy access. The pin 34 extends through a passage 43 through the housing 3, shielding it from inadvertent contact during operation. With additional reference to FIGS. 9A-10B, the pin 34 is moveable within the passage 43 between a first position (FIG. 9A) in which the first end 34*a* extends outward from the passage and a second position (FIG. 10A) in which the second end 34*b* extends outward from the passage. When the pin 34 is in the first position, the valve assembly 27 is in a reverse operating position (FIG. 9B). The planar deflector 45 of the first valve member 31 is rotated counter-clockwise (as viewed in FIG. 9B) about axis 38 so that air entering the second valve member 33 through the air opening 39 of the first valve member 31 is directed through a first side port 47 of the second valve member 33. When the pin 34 is in the second position, the valve assembly 27 is in a forward operating position (FIG. 10B). The deflector 45 is rotated clockwise (as viewed in FIG. 10B) about axis 38 so that air entering the second valve member 33 is directed by the deflector 45 through a second side port 49 of the second valve member 33. The second valve member 33 contains an additional top port 50, which provides an exit passage for exhausted air from the motor. It is noted that in FIG. 3, the first valve member 31 is shown in a neutral position, between the reverse operating position and the forward operating position.

Continuing to follow the path of air A through the tool 1 in FIGS. 3, 9B, and 10B, once the air passes through the selector valve assembly 27, the air travels through either a first air passage 53 or a second air passage 55, depending on the directional position of the first valve member 31 and deflector 45, toward a pneumatic rotary motor, indicated generally at 57 (FIG. 3). In FIG. 9B, air is directed through the first side port 47 and first passage 53 and passes through the torque selector 17. It then enters the motor 57 for driving the motor in a reverse operating direction, ultimately powering rotation of the output member 7 as will become apparent. In FIG. 10B, air is directed through the second side port 49 and second passage 55 and passes directly to the motor 57 for driving the motor in a forward operating direction.

The pneumatic rotary motor 57, as illustrated in FIG. 3, is of a type known to those skilled in the art and comprises a rotor 59 and a plurality of vanes 61. A similar pneumatic rotary motor is described in detail in the U.S. Pat. No. 6,796,386. Air enters the motor 57 and expands against the vanes 61 which in turn rotate the rotor 59. A support shaft 63 extends from the rear end of the rotor 59 and a splined shaft 65 extends from the forward end of the rotor 59. The support shaft 63 fits within a ball bearing 60 mounted within a rearward end cap 67*b* of the motor 57. The splined shaft 65 has a splined portion 65*a* and a smooth portion 65*b*. The smooth portion 65*b* fits within a ball bearing 60 mounted in a forward end cap 67*a* of the motor 57, while the splined portion 65*a* extends beyond the forward end cap 67*a* and engages an impact clutch, indicated generally at 69, housed in the clutch case 5. The splined portion 65*a* fits within a grooved hole 71 of the impact clutch 69 to allow conjoint movement. The splined shaft 65 and the support shaft 63 of the rotor 59 extend generally along the longitudinal axis 4 of the housing 3, and the two sets of ball bearings 60 allow the rotor 59 to rotate freely within the motor 57.

As air travels through the air motor 57, it drives the splined shaft 65, which in turn drives the impact clutch 69 and output member 7. As is known in the art, the impact clutch 69 converts high speed rotational energy of the motor 57 into discrete, high torque impact moments on the output member 7. Because the high torque impacts are limited in duration, an operator can hold the tool 1 while imparting a larger moment to the output member 7 than would be possible were the high torque continually applied. Impact tools are useful for high torque applications, such as tightening or loosening a fastener requiring a high torque setting. The impact clutch 69 is of a type well known to those skilled in the art and will not be further described herein.

Air spent by the motor 57 is discharged through exhaust openings 73 in the motor and through port 50 of the second valve member 33. The spent air is then directed through orifices (not shown) in the housing 3 to the air exhaust 19 in the grip 11 for removal from the tool 1. This is conventional in the art.

FIGS. 11-16B illustrate a tool according to a second embodiment of the invention. The tool is indicated generally at 101, and parts of this tool corresponding to parts of the tool 1 of the first embodiment (FIGS. 1-10B) are indicated by the same reference numbers, plus "100".

Figure 12:
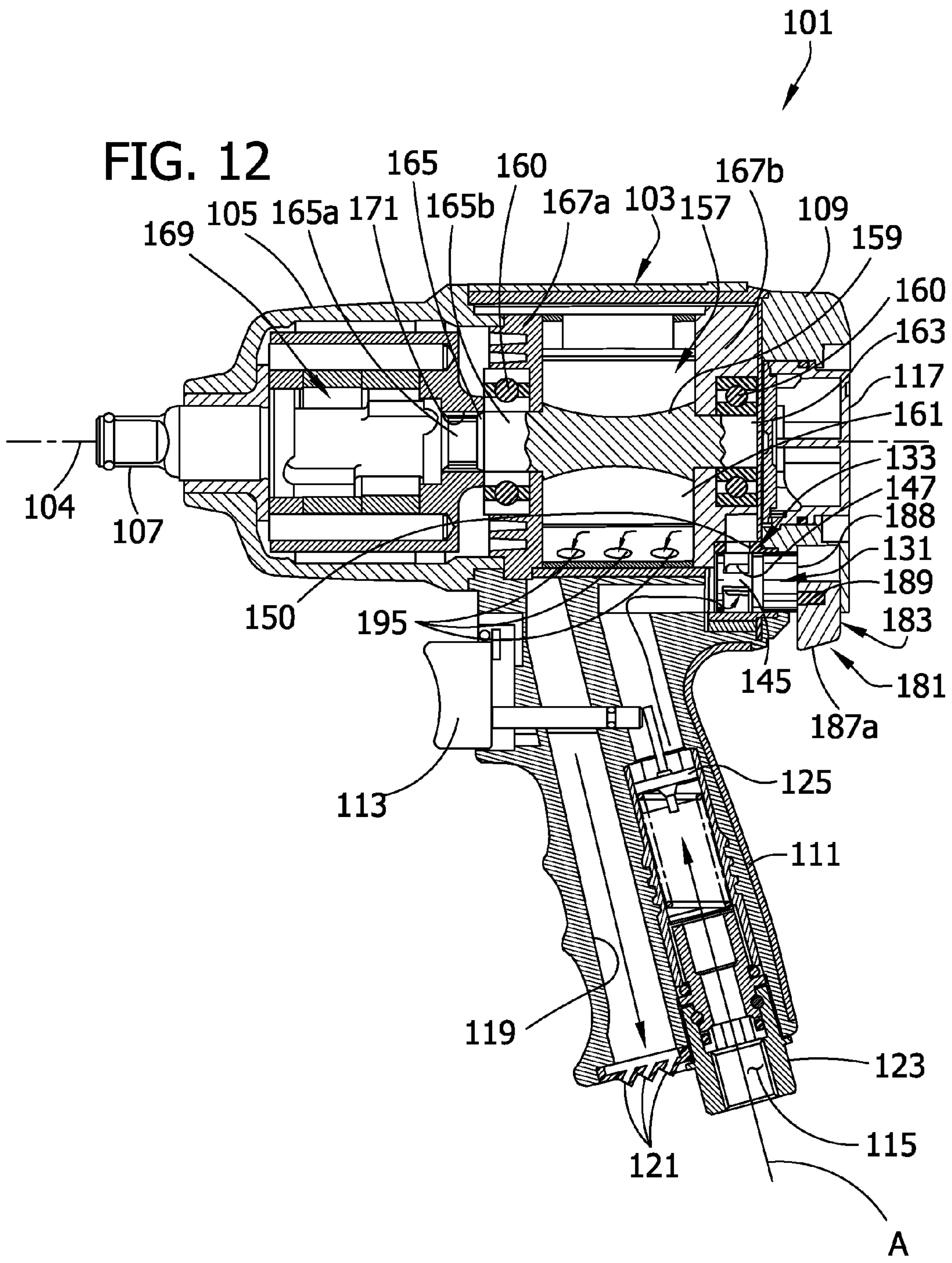
FIG. 12 is a vertical section thereof.
Figure 13:
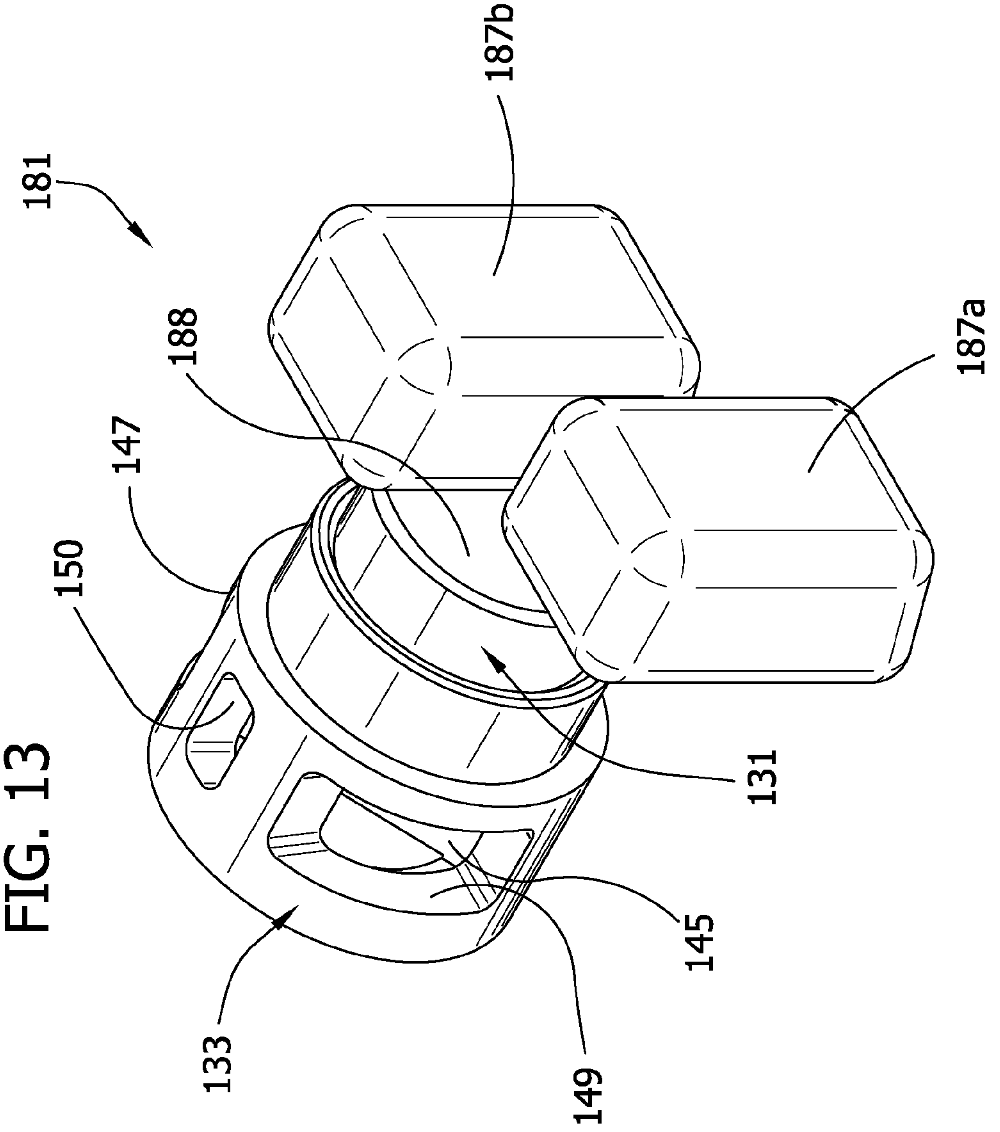
FIG. 13 is a perspective of a valve assembly and actuator of the tool of FIG. 11.
Figure 14:
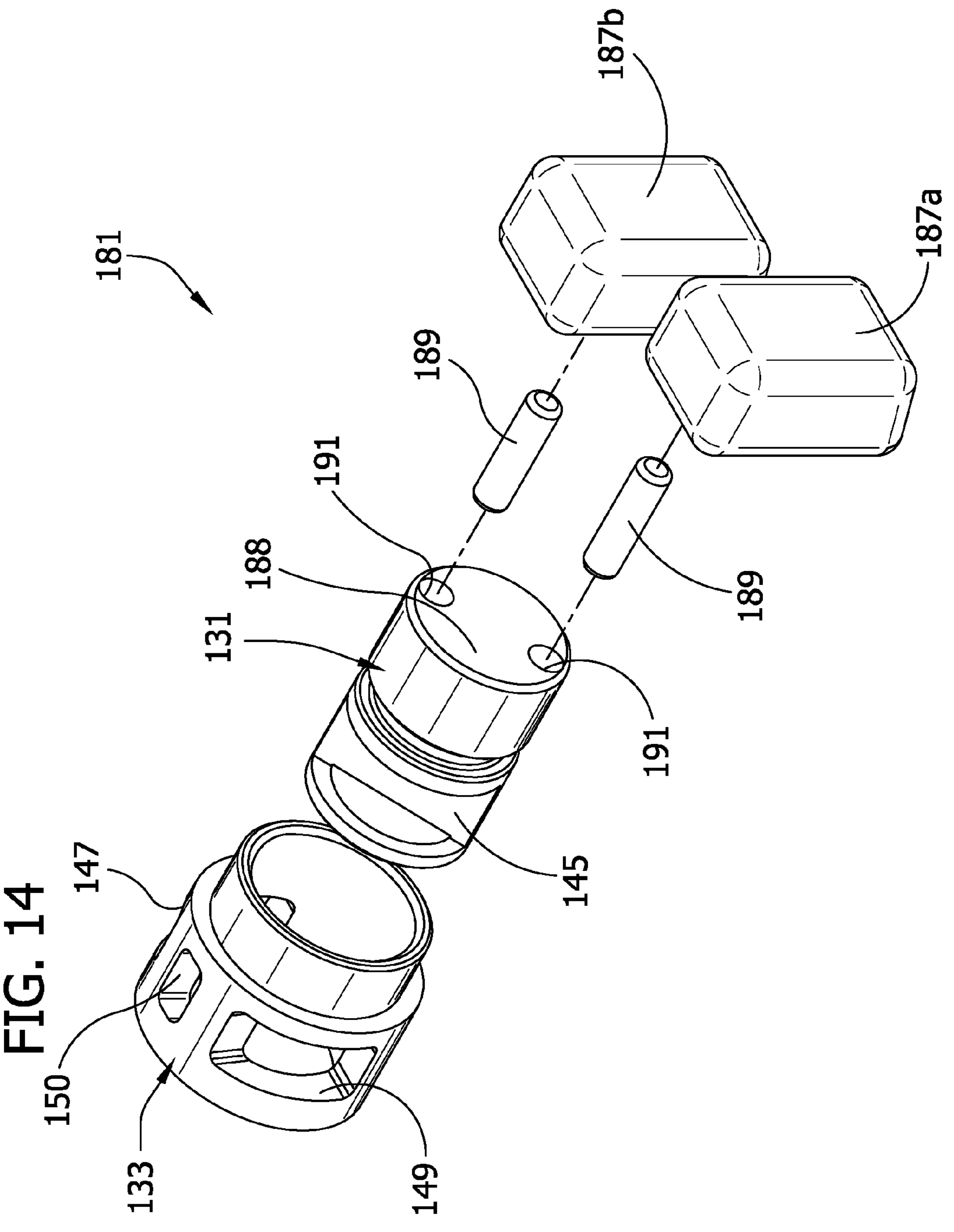
FIG. 14 is the perspective of FIG. 13 exploded.

As shown in FIGS. 11 and 12, the tool 101 of this embodiment is substantially similar to the tool 1 of the first embodiment. In this embodiment, however, a selector valve assembly 181 (FIGS. 12-14) is modified. The selector valve assembly 181 is located at a rear of the tool 101 generally under an end cover 109 of the tool. With additional reference to FIGS. 13 and 14, the selector valve assembly 181 comprises two push buttons 187*a*, 187*b* arranged side-by-side in parallel relation operatively connected to a first valve member (indicated generally at 131) for rotatably moving the valve member within a cylindrically shaped second valve member (indicated generally at 133) fixed in housing 103 (FIG. 12). The first valve member 131 and second valve member 133 can be broadly referred to as a "valve", and the push buttons 187*a*, 187*b* can be broadly referred to as an "actuator". The push buttons 187*a*, 187*b* connect to a major surface 188 of the first valve member 131 by pins 189 (broadly, "tabs") associated with the first valve member and which extend from openings 191 in the first valve member 131 and into slots 193 in the respective push buttons 187*a*, 187*b*. The slots 193 allow the push buttons 187*a*, 187*b* to move vertically relative to the housing 103 and produce the rotational movement of the first valve member 131 by accommodating the small amount of horizontal movement of the pins 189 resulting when the first valve member 131 rotates via a lost motion connection. It will be appreciated that other types of sliding lost motion connections may be used within the scope of the present invention. The push buttons 187*a*, 187*b* move in a substantially parallel direction to each other, and their direction of movement is substantially perpendicular to a longitudinal axis 104 of housing 103.

Figure 15A:
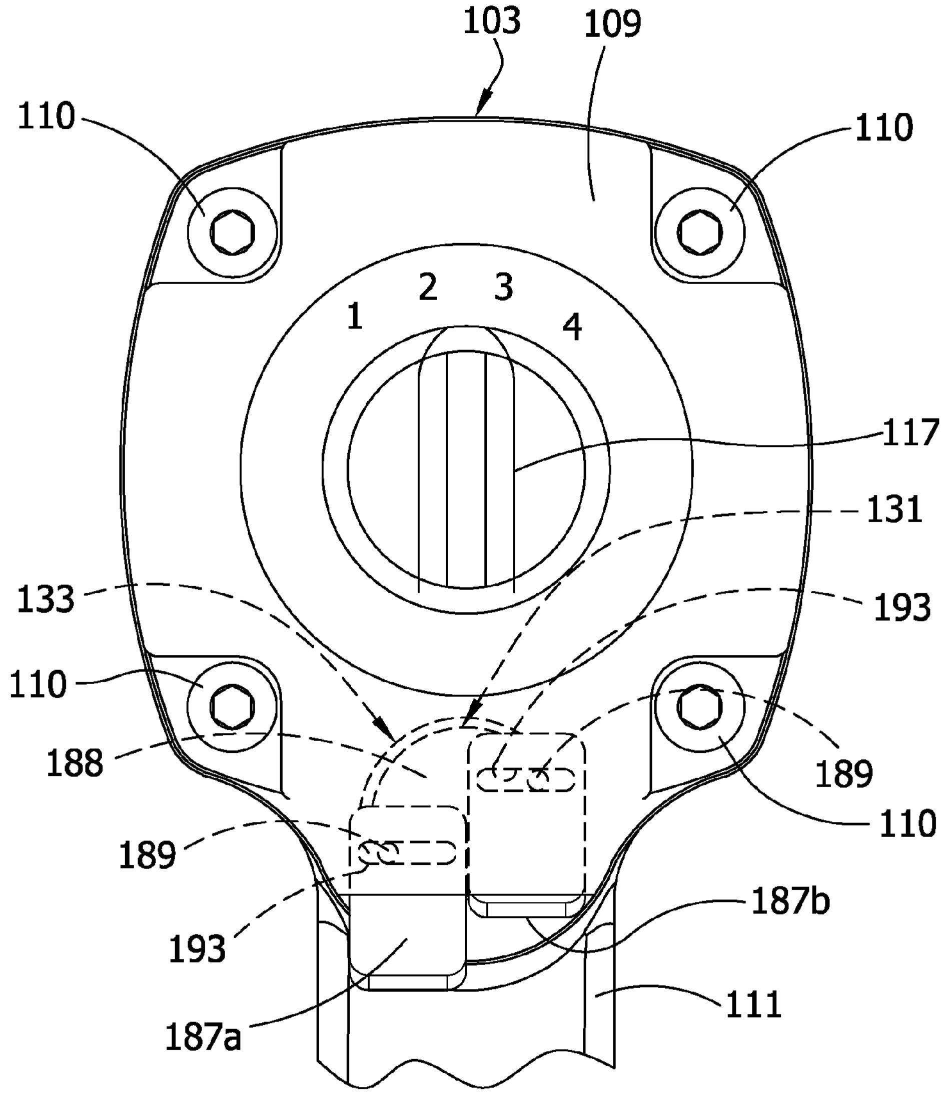
FIG. 15A is a fragmentary rear elevation of the tool of FIG. 11 with the valve assembly positioned to correspond to a forward operating position of the valve assembly.
Figure 15B:
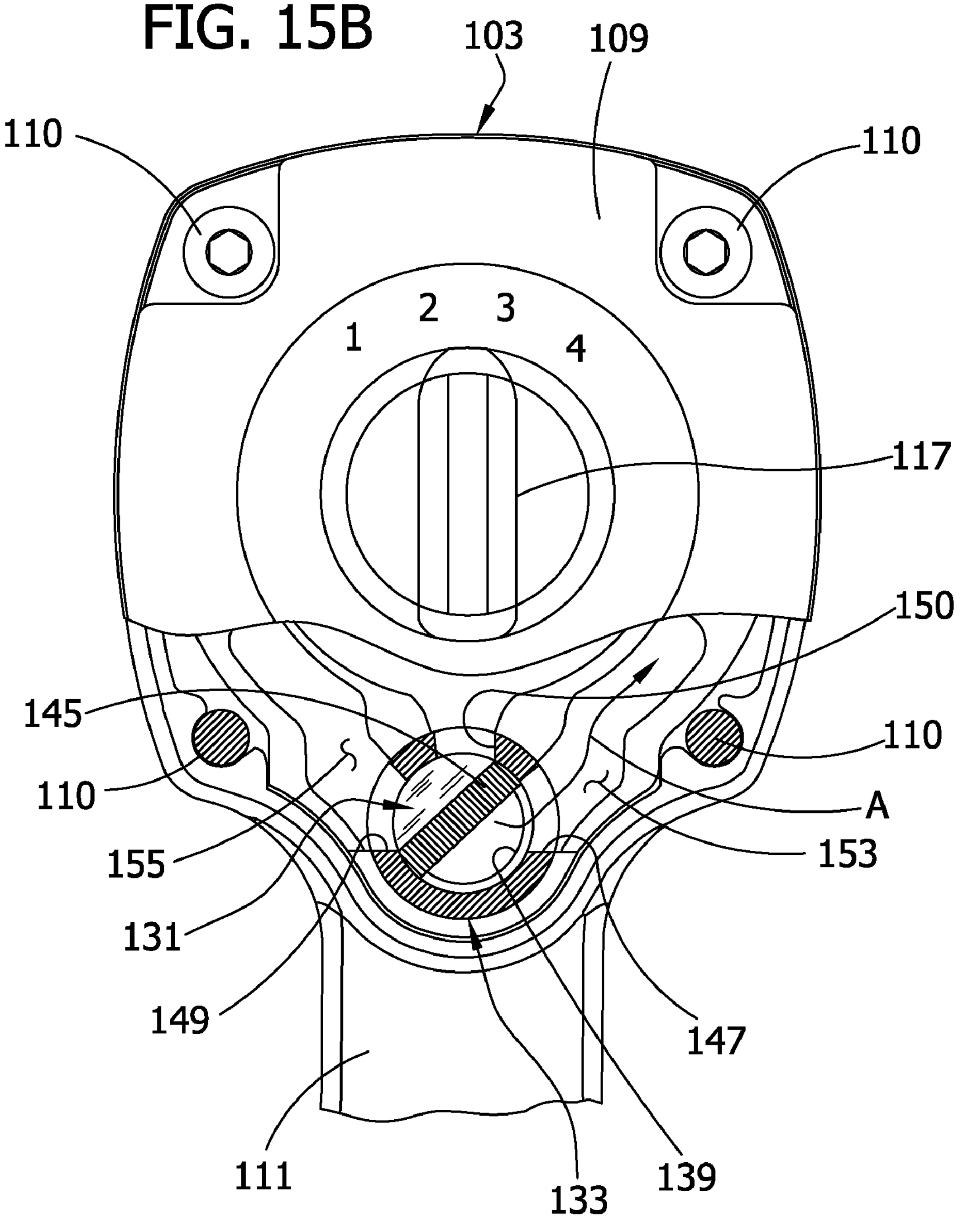
FIG. 15B is the fragmentary rear elevation of FIG. 15A with an end cap and the valve assembly partially broken away.
Figure 16A:
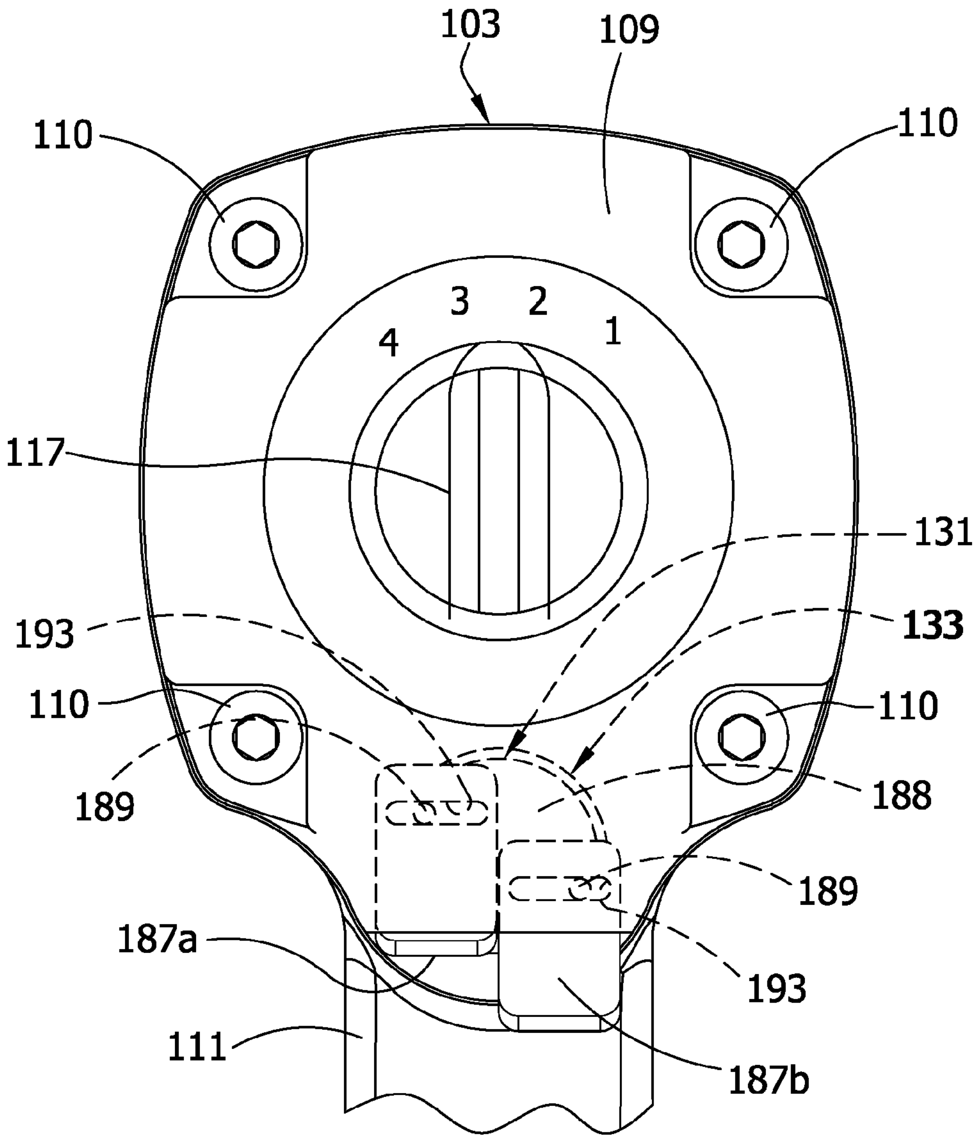
FIG. 16A is the elevation of FIG. 15A with the valve assembly positioned to correspond to a reverse operating position of the valve assembly.
Figure 16B:
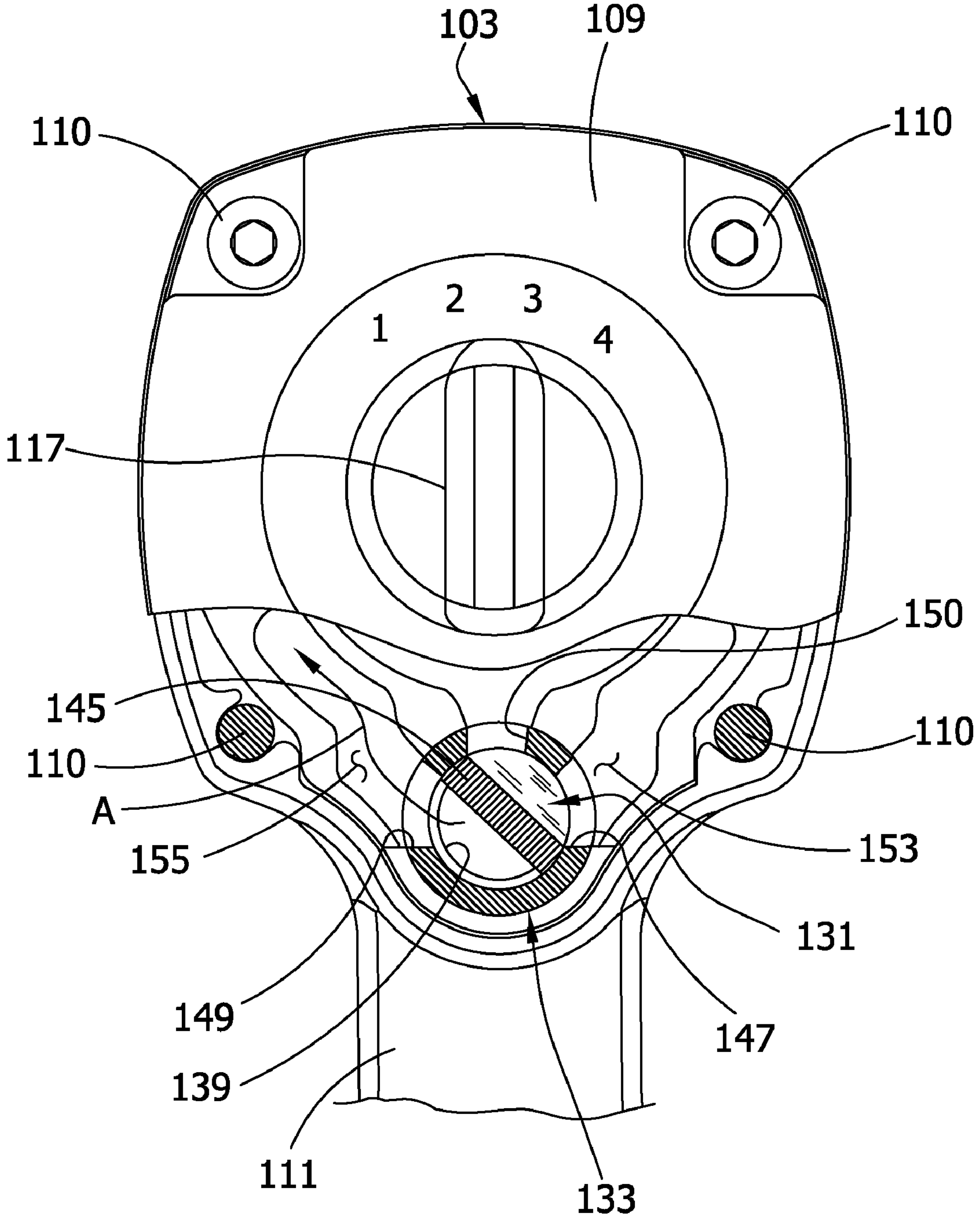
FIG. 16B is the fragmentary elevation of FIG. 16A with the end cap and the valve assembly partially broken away.
Figure 17:
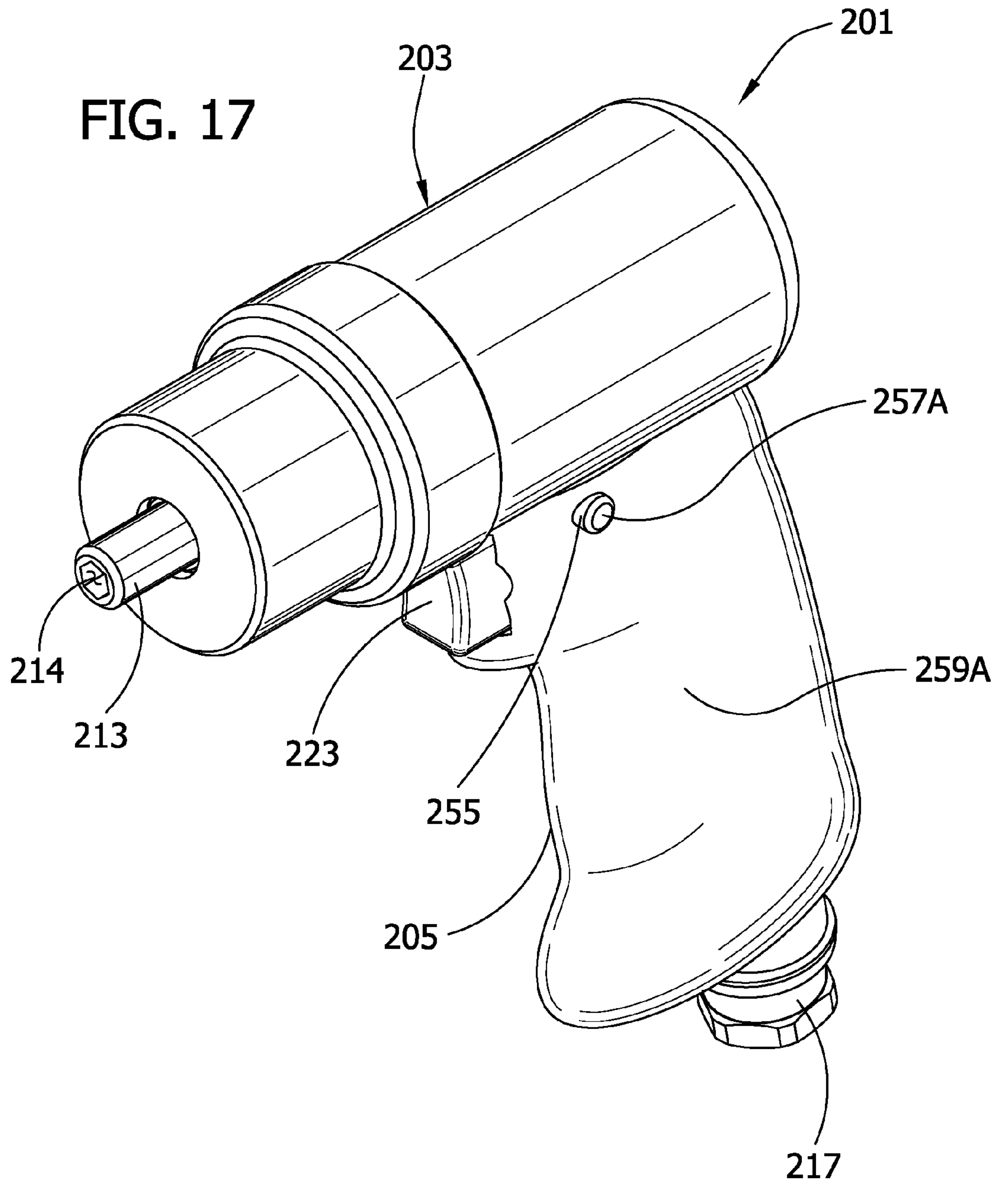
FIG. 17 is a perspective of a pneumatic rotary drill according to another embodiment of the present invention.

As shown in FIGS. 15A and 16A, the push buttons 187*a*, 187*b* of the valve assembly 181 are vertically positioned under the end cover 109, shielding them from inadvertent contact during operation. Portions of the push buttons 187*a*, 187*b* and second valve member 133 behind the end cover 109 are illustrated with broken lines in these figures. The push buttons 187*a*, 187*b* are moveable in a vertical direction so that either the first push button 187*a* or the second push button 187*b* extends below the end cover 109 while the other push button is substantially behind the end cover. In FIGS. 15A and 15B, the first push button 187*a* is below the end cover 109 and the valve assembly 181 is in a forward operating position. A deflector 145 of the first valve member 131 of the assembly 181 (similar to the deflector 45 of the first embodiment) is rotated counterclockwise from a horizontal position to an angle of about 45 degrees so that air entering the second valve member 133 through an air opening of the first valve member 131 (similar to air opening 39 of the first valve member 31 of the first embodiment) is deflected by the deflector through a first side port 147 of the second valve member and to a first air passage 153 in route to a motor 157 (FIG. 15B). Unlike the first embodiment, this configuration results in forward operation of the tool rather than reverse, because of a difference in the arrangement of the air motor (not shown). To change operation of the tool 101 to a reverse operating position, the first push button 187*a* is pressed upward, which rotates the first valve member 131 and moves the second push button 187*b* downward out of the housing 103 (FIG. 16A). The deflector 145 is rotated clockwise through horizontal to an angle of about 45 degrees so that air entering the second valve member 133 is deflected through a second side port 149 of the second valve member and to a second air passage 155 (FIG. 16B). By pushing the second push button 187*b* upward, the tool is again configured for forward operation.

Also in this embodiment, and as shown in FIG. 12, spent air from the motor 157 is discharged through exhaust openings 195 toward a bottom of the motor 157. The spent air is then directed through orifices (not shown) in the housing 103 to an air exhaust 119 in a grip 111 for removal from the tool 101. In all other aspects, operation of the tool 101 of this embodiment is substantially the same as was described for the tool 1 of the first embodiment.

Referring to FIGS. 17-23, another embodiment of the present invention is a pneumatic rotary drill, generally indicated at 201. The drill comprises a housing, generally indicated at 203, including a grip 205 for a user to hold and operate the drill 201. An upper portion of the housing 203 supports a drive mechanism, generally indicated at 207, including an air motor 209, for rotating an output member 213 (e.g., a drill chuck) extending forward from the upper portion of the housing about a rotational axis $A_1$. The output member 213 has a hexagonal cavity 214 for receiving a drill bit (not shown). Like the tools of the above embodiments, the air motor 209 of the air drill 201 is adapted to either rotate clockwise to impart forward or clockwise rotation of the output member 213 or rotate counter-clockwise to impart reverse or counter-clockwise rotation of the output member. The drive mechanism 207 by which the motor rotates and imparts rotation to the output member is well-known in the art and will not be described in detail herein.

Figure 18:
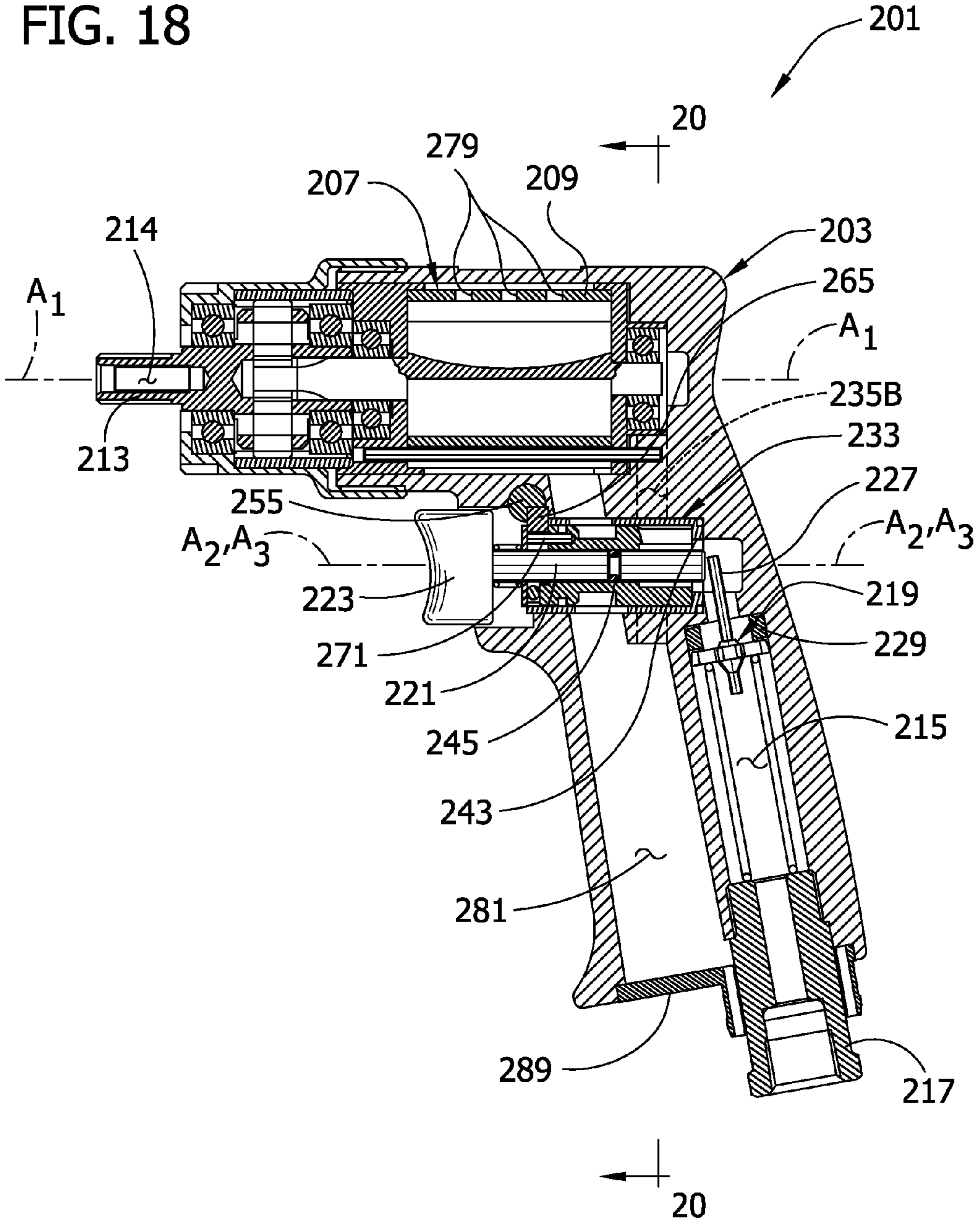
FIG. 18 is a section taken along the length of the drill.

The air motor is 209 driven by pressurized air delivered to the air motor from a source of pressurized fluid (not shown) through a series of fluidly connected air passages in the housing 203. An inlet passage 215 in the grip 205 is connectable to the source of pressurized air by securing a hose (not shown) to a connector 217 at the bottom of the grip. Referring to FIG. 18, a tilt valve 219 (designated generally), which is similar to the tilt valves of the previous embodiments in both structure and operation, is disposed between the inlet passage 215 and the remainder of the air passages in the drill 201. Other suitable valves may be used within the scope of the present invention. A plunger 221 extending rearward from a trigger 223 actuates opening of the tilt valve 219. Depressing (pulling) the trigger 223 moves the plunger 221 linearly rearward along its longitudinal axis A2 so that a free end of the plunger contacts a stem 227 of the valve 219 and forces the valve off its seat 229 to open the valve so that pressurized air flows to the air motor 209.

Figure 19:
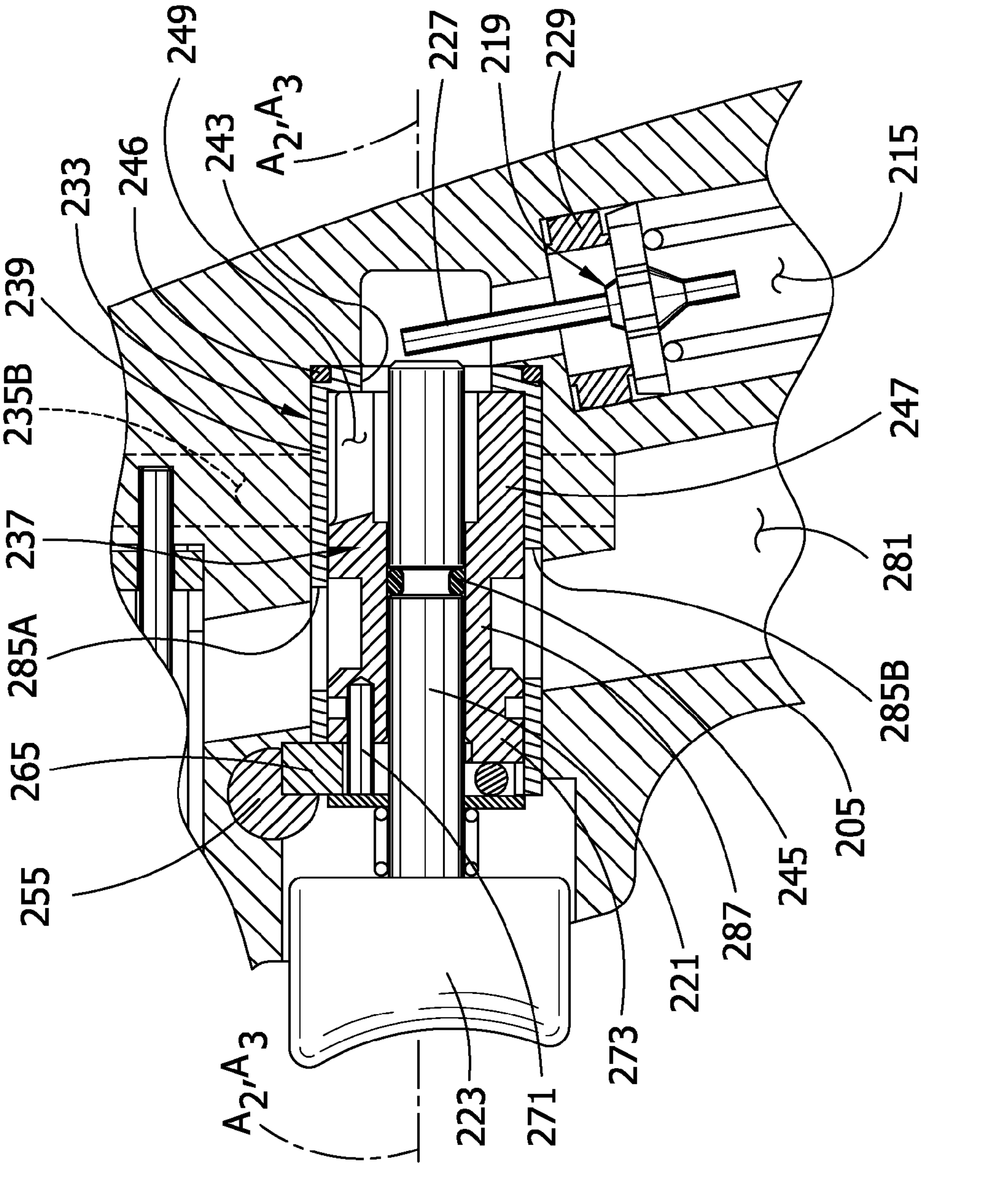
FIG. 19 is an enlarged, fragmentary view of FIG. 18.
Figure 20:
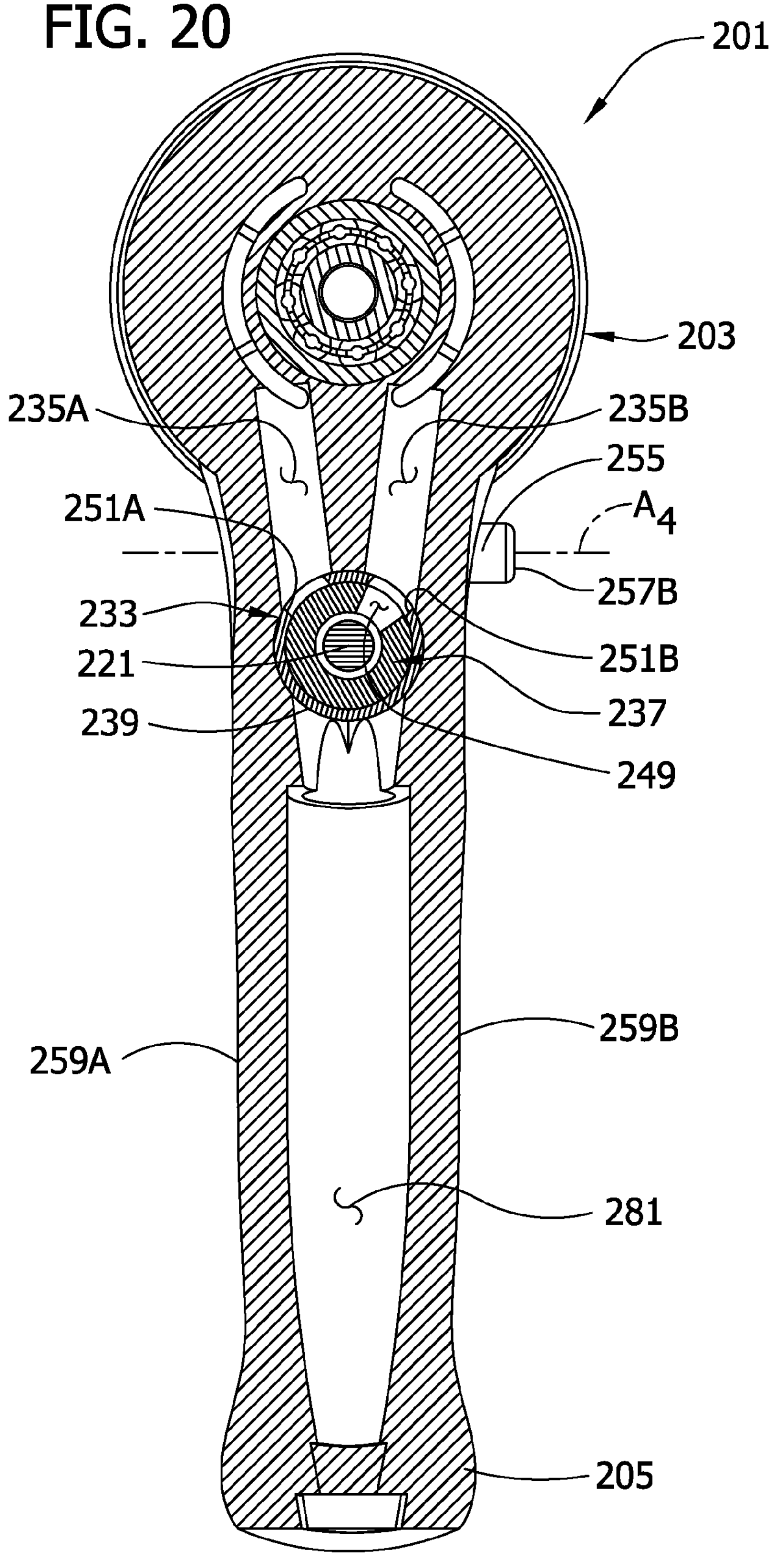
FIG. 20 is a sectional view taken in the plane including the line 20-20 in FIG. 18, with a reversible valve assembly configured to direct air to drive an air motor counter-clockwise.
Figure 21:
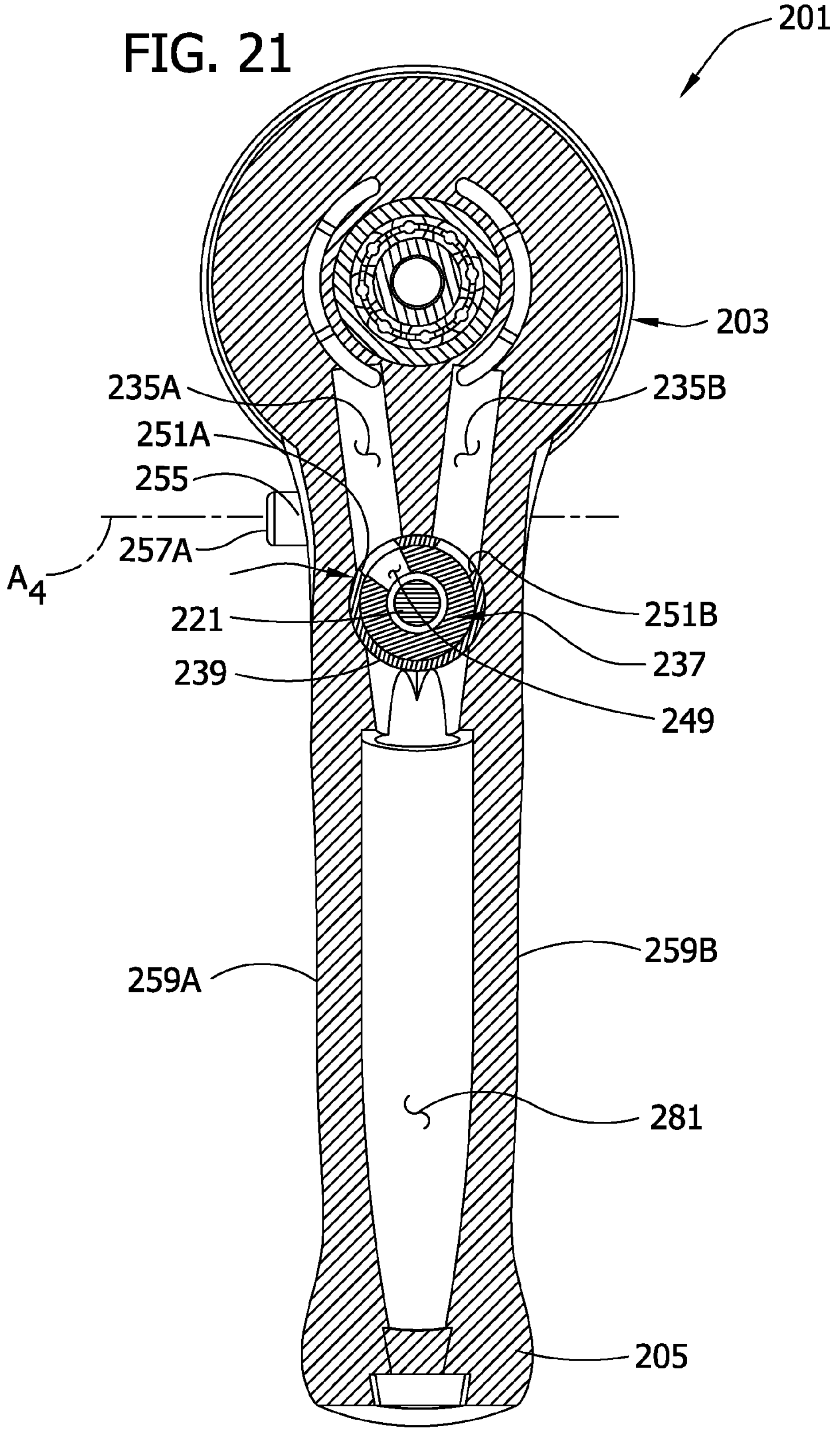
FIG. 21 is similar to FIG. 20, with the reversible valve assembly configured to direct air to drive the air motor clockwise.

Referring to FIGS. 18-23, downstream of the tilt valve 219 and upstream of the air motor 209 is a reversible valve assembly, generally indicated at 233, for directing the pressurized air entering the valve from the inlet passage 215 into either a forward-driving air passage 235A to drive the motor clockwise (FIG. 21), or a reverse-driving air passage 235B to drive the motor counter-clockwise (FIG. 20). As shown best in FIGS. 18 and 22, the reverse valve assembly 233 includes a generally cylindrical rotor 237 (broadly, a valve component) received within a cylindrical bushing 239 (broadly, a valve body) that is fixedly received in the housing 203. The plunger 221 (FIG. 18) is slidably received in an axial opening 241 of the rotor 237 so that a free end margin of the plunger extends through the rotor and a rear inlet port 243 in the bushing 239 where the free end of the plunger engages the stem 227 of the tilt valve 219. For reasons discussed below, the rotor 237 is rotatable about a rotational axis A3 that is generally coincident with the longitudinal axis A2 of the plunger 221. An O-ring 245 (FIG. 19) received within a circumferential slot in the exterior surface of the plunger 221 sealingly engages the interior surface of the rotor 237 defining the axial passage 241 to prevent air from leaking out of the valve 233 through the axial passage. Thus, the plunger 221 is sealingly and slidingly engaged with the rotor 237. Another O-ring 246 (FIGS. 18 and 19) received around a rear portion of the bushing 239 sealingly engages the housing 203 to prevent air leaking between the bushing and the housing.

Referring to FIG. 19, a rear portion 247 of the rotor 237 sealingly engages the interior surface of the bushing 239 so that pressurized air entering the valve 233 from the inlet port 243 cannot flow between the rotor and the bushing. A slot 249 (FIGS. 19-23) extends longitudinally from a rear end of the rotor 237 along an upper portion of the rotor. Selective rotation of the rotor 237, as will be described, radially aligns the slot 249 with one of first and second outlet ports 251A, 251B, respectively, in the bushing 239. The first outlet port 251A is fluidly connected with the forward-driving passage 235A and the second outlet port 251B is fluidly connected with the rearward-driving passage 235B. When the rotor slot 249 is radially aligned with the first outlet port 251A (FIG. 21), the valve 235 is in a forward-driving configuration, whereby the first outlet port is open and the second outlet port 251B is closed. In the forward-driving configuration, pressurized air entering the valve 235 through the inlet port 243 is directed solely to the forward-driving air passage 235A to drive the motor, and in turn the output member 213, clockwise. Similarly, when the rotor slot 249 is radially aligned with the second outlet port 251B (FIG. 20), the valve 235 is in a reverse-driving configuration, and the second outlet port is open and the first outlet port 251A is closed. In the reverse-driving configuration, pressurized air entering the valve 235 through the inlet port 243 is directed solely to the reverse-driving air passage 235B.

Selective rotation of the rotor 237 to configure the valve 233 between its forward-driving configuration and its reverse-driving configuration is actuated by linear, translational movement of a push button 255 (broadly, an actuator). The push button 255 is generally rod-shaped and is slidably received in the housing 203 generally rearward of the trigger 223 at a front portion of the grip 205. The push button 255 is slidable along a generally linear actuating axis A4 (FIGS. 20 and 21) that is generally transverse (e.g., generally perpendicular) to the rotational axis A3 of the rotor 237. More particularly, the push button 255 is moveable between a first position (FIG. 21), in which a right end 257A of the button is protruding laterally outward from a right side 259A of the housing 203, and a second position (FIG. 20), in which a left end 257B of the button is protruding laterally outward from a left side 259B of the housing.

Figure 22:
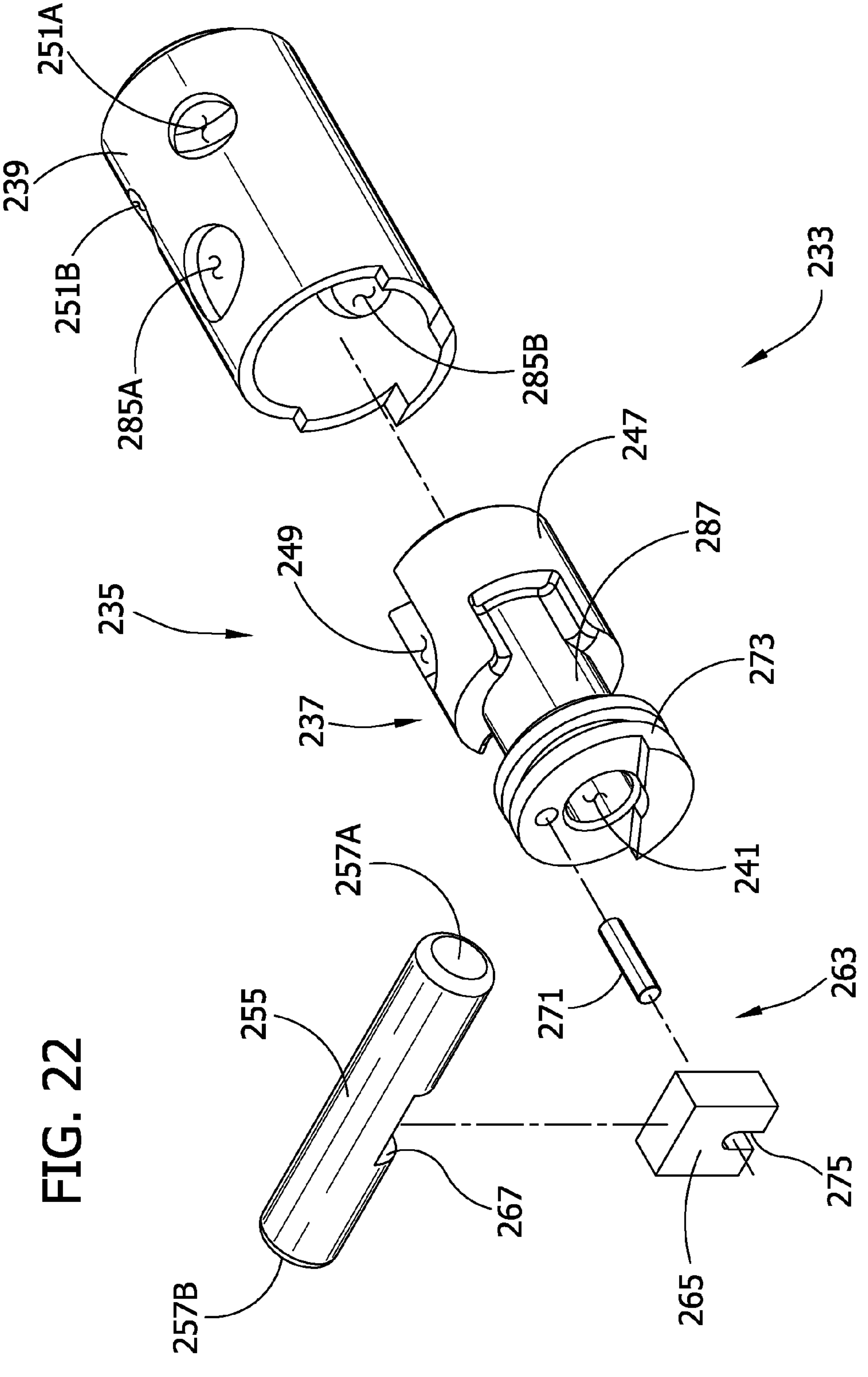
FIG. 22 is an enlarged, exploded perspective of the reversible valve assembly.
Figure 23:
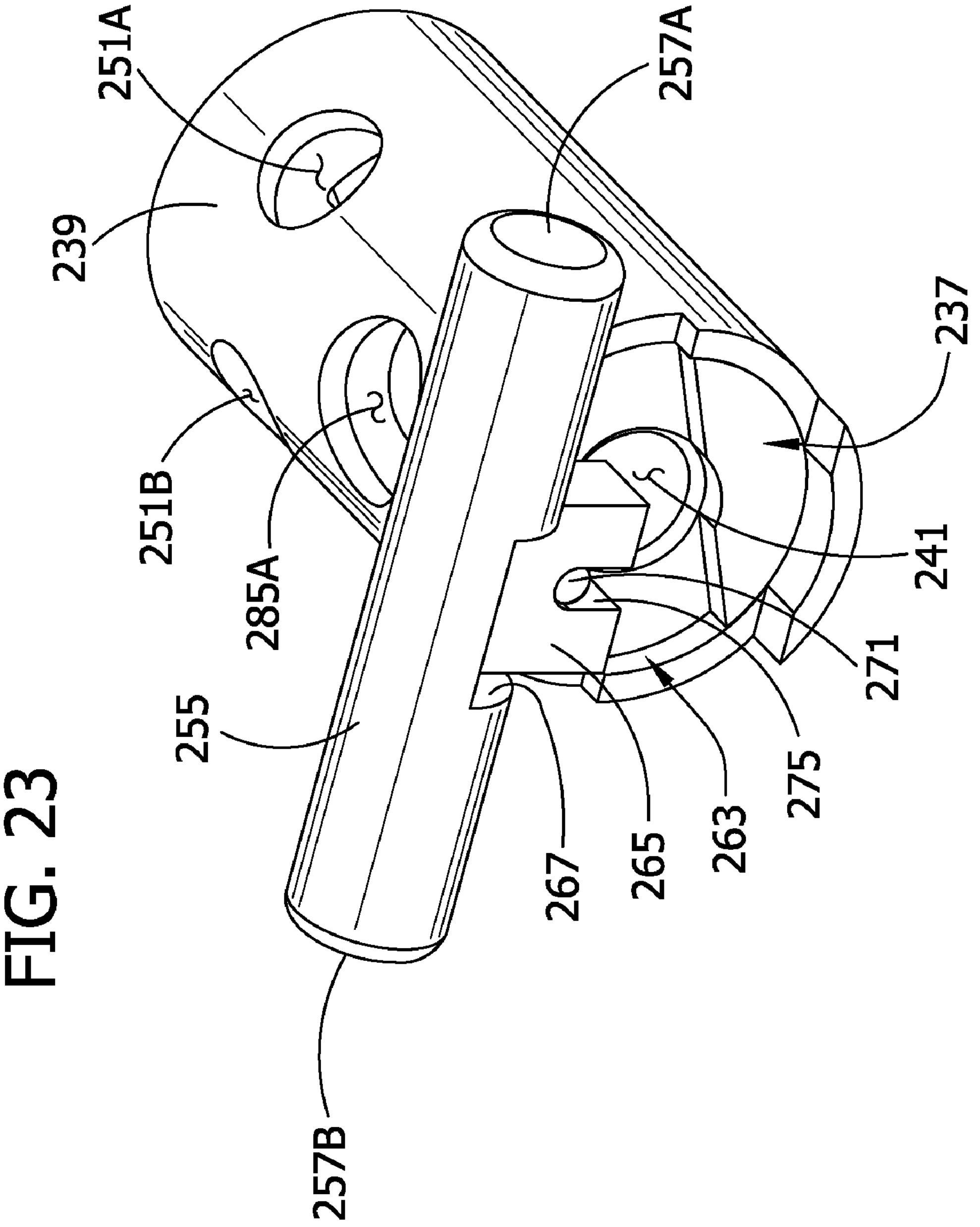
FIG. 23 is an enlarged perspective of the reversible valve assembly.

Referring to FIGS. 22 and 23, a connection system, more specifically a lost motion connection system, generally indicated at 263, operatively connects the push button 255 to the rotor 237 of the valve 233 so that linear movement of the push button along the actuating axis A4 imparts rotational movement of the rotor. The connection system includes a slide plate 265 secured within a cavity 267 of the push button 255 and extending downward therefrom generally perpendicular to the actuating axis A4. A stem 271 of the connection system 263 extends forward from a front portion 273 of the rotor 237 and is received in a slot 275 of the slide plate 265. The slot 275 extends vertically from a bottom surface of the plate 265 and is sized and shaped to allow the stem 271 to move or slide vertically therein. Thus, when the slide plate 265 is connected to the stem 271, translational movement of the push button 255 and the slide plate 265 is converted to angular movement of the stem 271 and angular movement of the rotor 237 about its rotational axis A3. In the illustrated embodiment, pushing the right end 257A of the button 255 to slide the button to the left rotates the stem 271 and the rotor 237 counter-clockwise to the forward-driving position where slot 249 in the rotor is radially aligned with the first outlet port 251A and the forward-driving air passage 235A. Conversely, pushing the left end 257B of the button 255 to slide the button to the right rotates the rotor 237 clockwise to the reverse-driving position where the slot 249 in the rotor is aligned with the second outlet port 251B and the reverse-driving air passage 235B.

Referring to FIGS. 18 and 19, after the air enters the air motor 209 from the selected one of the forward-driving and reverse-driving air passages 235A, 235B, and rotates the air motor to drive the drive mechanism 207, the air exits the air motor through exit openings 279 in the motor and enters an exhaust passage 281 in the grip 205 of the drill 201. Before exiting the exhaust passage 281 into the atmosphere, the air passes through the valve 233 which is fluidly connected to the exhaust passage. The valve bushing 239 has an upper exhaust opening 285A to allow air to flow into the valve 233 from the exhaust passage 281 and a lower exhaust opening 285B to allow air to exit the valve and reenter the exhaust passage. An intermediate portion 287 of the rotor 237 disposed between the upper and lower exhaust openings 285A, 285B of the bushing 239 has a reduced exterior diameter less than the interior diameter of the bushing to allow the air flowing from the upper exhaust opening to pass around the intermediate portion and exit through the lower exhaust opening. After passing through the valve 233 and reentering the exhaust passage 281, the air passes through a diffuser 289 at the bottom of the grip 205 and into the atmosphere. Other ways of accommodating for exhaust air exiting the air motor is within the scope of the invention.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

The invention claimed is:

1. A pneumatic tool comprising:

a housing;

an output member supported by the housing for rotational movement relative to the housing about a longitudinal output axis;

an air motor disposed in the housing and operatively connected to the output member for driving the output member in either a reverse direction or a forward direction;

air passaging in the housing for delivering pressurized air to the air motor, the air passaging having an inlet;

a plunger slidable along a plunger axis for selectively opening and closing the inlet of the air passaging to selectively introduce pressurized air into the air passaging;

a valve comprising a valve component disposed within the air passaging, the valve component being selectively rotatable about a rotational axis extending generally parallel to the plunger axis between a forward-driving position, in which the valve component directs pressurized air entering the passaging through inlet to the air motor to drive the motor in the forward direction, and a reverse-driving position, in which the valve component directs pressurized air entering the passaging through the inlet to the air motor to drive the motor in the reverse direction;

an actuator supported by the housing and adapted to translate along a generally linear actuating axis extending lateral to the output axis as the valve rotates between the forward-driving position and the reverse-driving position; and a connection system interconnecting the actuator and the valve, the connection system adapted to convert the translational movement of the actuator along the linear actuating axis into angular movement of the valve component about the rotational axis to selectively rotate the valve component between the forward-driving position and the reverse-driving position, the connection system comprising connector elements engaged for generally conjoint movement in a first, linear direction and for relative sliding movement in a second, linear direction generally perpendicular to the first direction.

2. A pneumatic tool as set forth in claim 1 wherein the connection system comprises a first connector element and a second connector element, the connector elements being engaged for generally conjoint movement in a first direction and for relative sliding movement in a second direction generally perpendicular to the first direction.

3. A pneumatic tool as set forth in claim 2 wherein the linear actuating axis is generally transverse to a longitudinal axis of the plunger.

4. A pneumatic tool as set forth in claim 2 wherein the first connector element includes a slot and the second connector element includes a stem received in the slot.

5. A pneumatic tool as set forth in claim 4 wherein the slot is associated with the actuator and the stem is associated with the valve.

6. A pneumatic tool as set forth in claim 5 wherein the first connector element comprises a slide member extending outward from the actuator generally perpendicular to the actuating axis of the actuator.

7. A pneumatic tool as set forth in claim 6 wherein the slide member extends generally downward from the actuator.

8. A pneumatic tool as set forth in claim 6 wherein the stem extends outward from the valve component and lies in a plane generally parallel to the rotational axis of the valve component.

9. A pneumatic tool as set forth in claim 3 wherein the plunger is sealingly received in an axial opening of the valve component, the valve component being selectively rotatable about a longitudinal axis of the plunger.

10. A pneumatic tool as set forth in claim 9 wherein the plunger is sealingly slidable in the valve component.

11. A pneumatic tool as set forth in claim 9 wherein the air passaging includes a forward-driving air passage for delivering pressurized air from the air inlet to the motor to drive the output member in the forward direction, and a reverse-driving passage for delivering pressurized air from the air inlet to the motor to drive the output member in the reverse direction.

12. A pneumatic tool comprising:

a housing;

an output member supported by the housing for rotational movement relative to the housing;

an air motor disposed in the housing and operatively connected to the output member for driving the output member in either a reverse direction or a forward direction;

a main inlet in the housing for receiving pressurized air from a source of pressurized air to power the motor, the inlet being configured to be selectively closed and opened;

in-flow passaging in the housing defining an in-flow path for directing pressurized air from the inlet to the motor, the in-flow passaging including a forward-driving air passage for delivering pressurized air from the air inlet to the motor to drive the output member in the forward direction, and a second air passage for delivering pressurized air from the air inlet to the motor to drive the output member in the reverse direction;

a trigger including a plunger moveable linearly along its longitudinal axis for actuating selective opening and closing of the main inlet to respectively allow introduction of pressurized air into the in-flow passaging;

a valve comprising a valve component disposed between the inlet and the forward-driving and reverse-driving passages, the valve component being mounted for rotation generally about the plunger on a rotational axis between a forward-driving position, in which the valve component directs air flow to the forward-driving air passage to drive the motor in the forward direction, and a reverse-driving position, in which the valve component directs air flow to the reverse-driving air passage to drive the motor in the reverse direction;

an actuator supported by the housing for translational movement along a single linear actuating axis such that movement in a first direction causes a first end of the actuator to protrude from the housing and movement in a second direction causes a second end of the actuator opposite the first end to protrude from the housing, the ends being disposed generally on the actuating axis; and a connection system interconnecting the actuator and the valve, the connection system adapted to translate linear movement of the actuator along the linear actuating axis into rotational movement of the valve component, the connection system comprising connector elements engaged for generally conjoint movement in a first, linear direction and for relative sliding movement in a second, linear direction generally perpendicular to the first direction.

* * * * *